US011343324B2

(12) United States Patent
Shi et al.

(10) Patent No.: US 11,343,324 B2
(45) Date of Patent: May 24, 2022

(54) 5G INTERNET OF THINGS DATA DELIVERY

(71) Applicant: IDAC HOLDINGS, INC., Wilmington, DE (US)

(72) Inventors: Xiaoyan Shi, Westmount (CA); Guanzhou Wang, Brossard (CA); Saad Ahmad, Montreal (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/788,764

(22) Filed: Feb. 12, 2020

(65) Prior Publication Data

US 2020/0186606 A1 Jun. 11, 2020

Related U.S. Application Data

(63) Continuation of application No. 16/148,642, filed on Oct. 1, 2018, now Pat. No. 10,587,695.

(Continued)

(51) Int. Cl.
*H04L 29/08* (2006.01)
*H04W 76/20* (2018.01)
(Continued)

(52) U.S. Cl.
CPC .......... *H04L 67/141* (2013.01); *H04L 67/143* (2013.01); *H04W 76/20* (2018.02);
(Continued)

(58) Field of Classification Search
CPC .................................................. H04L 67/141
(Continued)

(56) References Cited

U.S. PATENT DOCUMENTS 10,587,695 B2 * 3/2020 Shi ..................... H04W 76/34
2004/0125753 A1 * 7/2004 Mahany ................ H04L 1/1685
370/254

(Continued)

OTHER PUBLICATIONS

3rd Generation Partnership Project (3GPP), S2-173005, "Description of SM Information and PDU Session ID on N11 and N1", Ericsson, SA WG2 Meeting #121, Hangzhou, China, May 15-19, 2017, pp. 1-27.

(Continued)

*Primary Examiner* — Peter G Solinsky
(74) *Attorney, Agent, or Firm* — Condo Roccia Koptiw LLP

(57) ABSTRACT

A wireless transmit/receive unit (WTRU) may establish one or more protocol data unit (PDU) sessions via a radio access network (RAN) node. The WTRU may transition to an inactive state. The WTRU may send a connection resume message to a RAN node that indicates a request to resume the established plurality of PDU sessions via the RAN node. The WTRU may receive a message from the RAN node. For example, the RAN node may send a message indicating a subset of the plurality of PDU sessions that are available upon resuming a connection with the RAN node. The WTRU may deactivate at least one established PDU session of the plurality of PDU sessions based on the received message from the RAN node that indicates at least one established PDU session not being included in the subset of the plurality of PDU sessions that are available.

19 Claims, 17 Drawing Sheets

Related U.S. Application Data

(60) Provisional application No. 62/572,127, filed on Oct. 13, 2017.

(51) Int. Cl.
| | |
|---|---|
| *H04W 76/34* | (2018.01) |
| *H04W 84/04* | (2009.01) |
| *H04L 67/141* | (2022.01) |
| *H04L 67/143* | (2022.01) |
| *H04L 67/12* | (2022.01) |

(52) U.S. Cl.
CPC ............ *H04W 76/34* (2018.02); *H04L 67/12* (2013.01); *H04W 84/042* (2013.01)

(58) Field of Classification Search
USPC ........................................................ 370/254
See application file for complete search history.

(56) References Cited

U.S. PATENT DOCUMENTS

| | | | |
|---|---|---|---|
| 2017/0202050 A1 | 7/2017 | Deng | |
| 2018/0124650 A1* | 5/2018 | Park | H04L 41/0873 |
| 2018/0270704 A1* | 9/2018 | Furuichi | H04W 80/06 |
| 2018/0270894 A1 | 9/2018 | Park et al. | |
| 2018/0332462 A1 | 11/2018 | Kim et al. | |
| 2018/0368039 A1 | 12/2018 | Wu | |
| 2019/0029066 A1 | 1/2019 | Xu et al. | |
| 2019/0037632 A1 | 1/2019 | Uchino et al. | |
| 2019/0104455 A1 | 4/2019 | Park et al. | |
| 2019/0104474 A1 | 4/2019 | Raghunathan et al. | |
| 2019/0104564 A1 | 4/2019 | Johansson et al. | |
| 2019/0141776 A1 | 5/2019 | Kim et al. | |
| 2019/0246318 A1 | 8/2019 | Kim et al. | |
| 2019/0246342 A1 | 8/2019 | Wang et al. | |
| 2019/0289570 A1* | 9/2019 | Kim | H04W 76/27 |
| 2019/0312711 A1 | 10/2019 | Stern-berkowitz et al. | |
| 2020/0037210 A1* | 1/2020 | Rugeland | H04W 12/08 |
| 2020/0304985 A1* | 9/2020 | Gupta | H04W 80/10 |

OTHER PUBLICATIONS

3rd Generation Partnership Project (3GPP), TS 23.401 V14.3.0, "Technical Specification Group Services and System Aspects, General Packet Radio Service (GPRS) Enhancements for Evolved Universal Terrestrial Radio Access Network (E-UTRAN) Access (Release 14)", Mar. 2017, pp. 1-386.

3rd Generation Partnership Project (3GPP), TS 23.501 V1.4.0, "Technical Specification Group Services and System Aspects, System Architecture for the 5G System, Stage 2 (Release 15)", Sep. 2017, pp. 1-152.

3rd Generation Partnership Project (3GPP), TS 23.502 V1.2.0, "Technical Specification Group Services and System Aspects, Procedures for the 5G System, Stage 2 (Release 15)", Sep. 2017, pp. 1-165.

3rd Generation Partnership Project (3GPP), TS 23.502 V1.0.0, "Technical Specification Group Services and System Aspects, Procedures for the 5G System, Stage 2 (Release 15)", Sep. 2017, pp. 1-166.

* cited by examiner

5G INTERNET OF THINGS DATA DELIVERY

CROSS-REFERENCE TO RELATED APPLICATIONS

This application is a continuation of U.S. Non-Provisional application Ser. No. 16/148,642, filed Oct. 1, 2019, which claims the benefit of U.S. Provisional Application Ser. No. 62/572,127 filed Oct. 13, 2017, the contents of which are incorporated by reference herein.

BACKGROUND

Mobile communications using wireless communication continue to evolve. A fifth generation or Next Gen (NG) may be referred to as 5G. A previous generation (e.g., legacy generation) of mobile communication may be fourth generation (4G) long term evolution (LTE).

SUMMARY

A wireless transmit/receive unit (WTRU) may establish one or more protocol data unit (PDU) sessions via a radio access network (RAN) node. The WTRU may transition to an inactive state, e.g., after establishing one or more PDU sessions via a RAN node. The WTRU may send a connection resume message to the RAN node from the inactive state. The connection resume message may indicate a request to resume the established plurality of PDU sessions via the RAN node. The connection resume message may be included in a radio resource control (RRC) message.

The WTRU may receive a message from the RAN node. In examples, the received message from RAN node may indicate a subset of the plurality of PDU sessions that are available upon resuming a connection with the RAN node. In examples, the received message may indicate a plurality of PDU session IDs that are available upon resuming the connection with the RAN node. The message (e.g., received from the RAN node) may be included in a RRC message.

The WTRU may deactivate (e.g., upon receiving the message from the RAN) at least one established PDU session of the plurality of PDU sessions based on the at least one established PDU session not being included in the subset of the plurality of PDU sessions that are available as indicated in the received message from the RAN node.

In examples, when the WTRU deactivates the at least one established PDU session, the WTRU may perform a new registration procedure via another RAN node (e.g., a new RAN node). The another RAN node may differ from the RAN node that the WTRU established one or more PDU sessions with. In examples, the another RAN node (e.g., the new RAN node) may be the same as the RAN node that the WTRU established one or more PDU sessions with.

In examples, when the WTRU deactivates the at least one established PDU session, the WTRU may be configured to release (e.g., locally release) and/or remove one or more user plane (UP) resources associated with the at least one established PDU session. For example, locally releasing the one or more UP resources associated with the at least one established PDU session may include deactivating one or more data radio bearers (DRBs) associated with the at least one established PDU session.

Networks may be optimized for the Internet of Things (IoT) data delivery. For example, an access and mobility management function (AMF) may make paging strategies. The paging strategies may be based on a downlink data indication from a session management function (SMF). The indication may be sent in a non-access stratum (NAS) message. For example, an AMF may determine to release a NAS connection, which may be based on an indication from a SMF and/or a WTRU. For example, a WTRU and/or a network may switch data delivery from a user plane to a control plane. For example, a WTRU may synchronize an internal list of active PDU session with a RAN. This synchronization may be done using a PDU session ID(s) maintained by a SMF. For example, a WTRU and/or a network may determine to maintain a serving RAN. This determination may be based the state of the WTRU and/or the amount of data that the WTRU may deliver.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
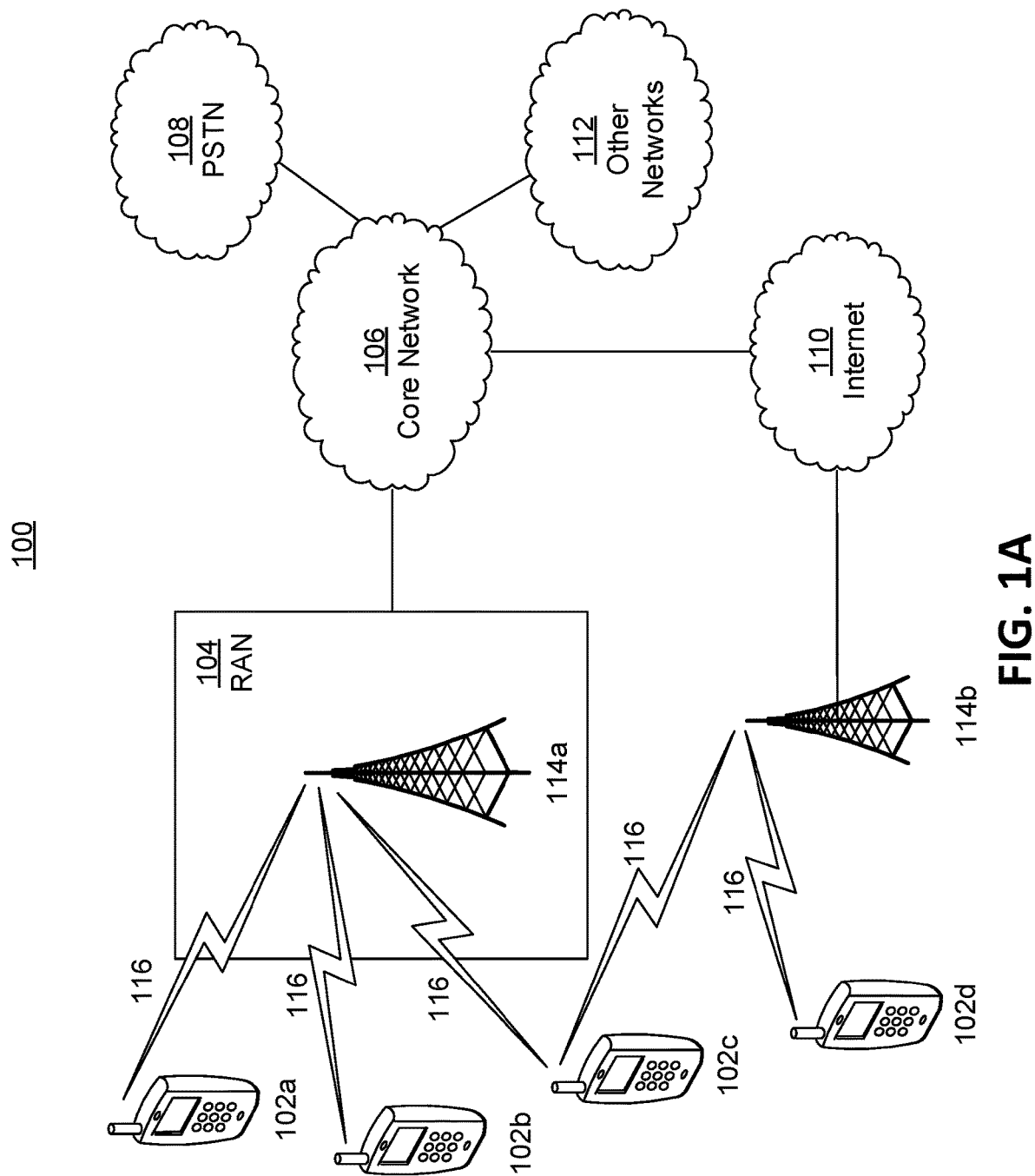
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
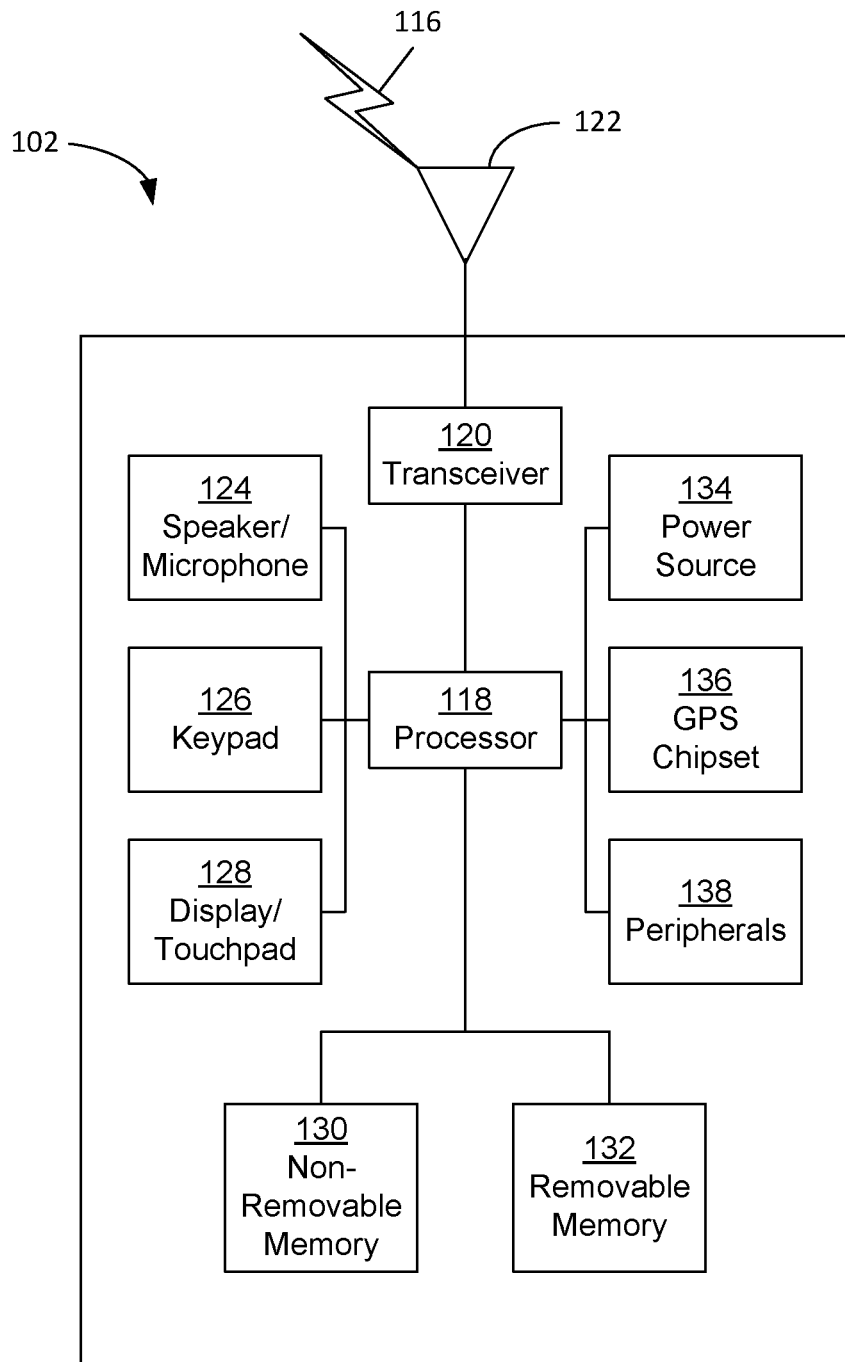
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
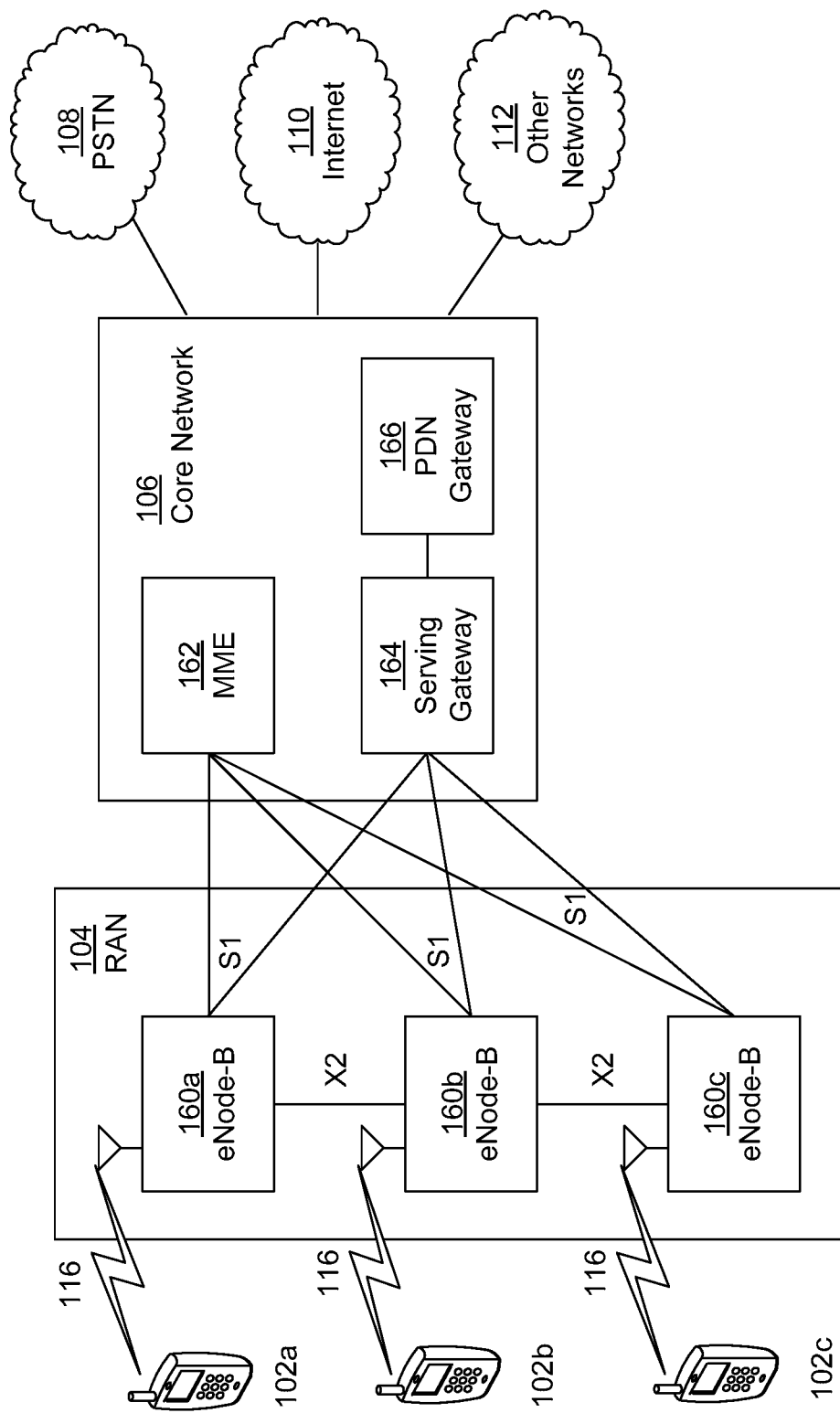
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
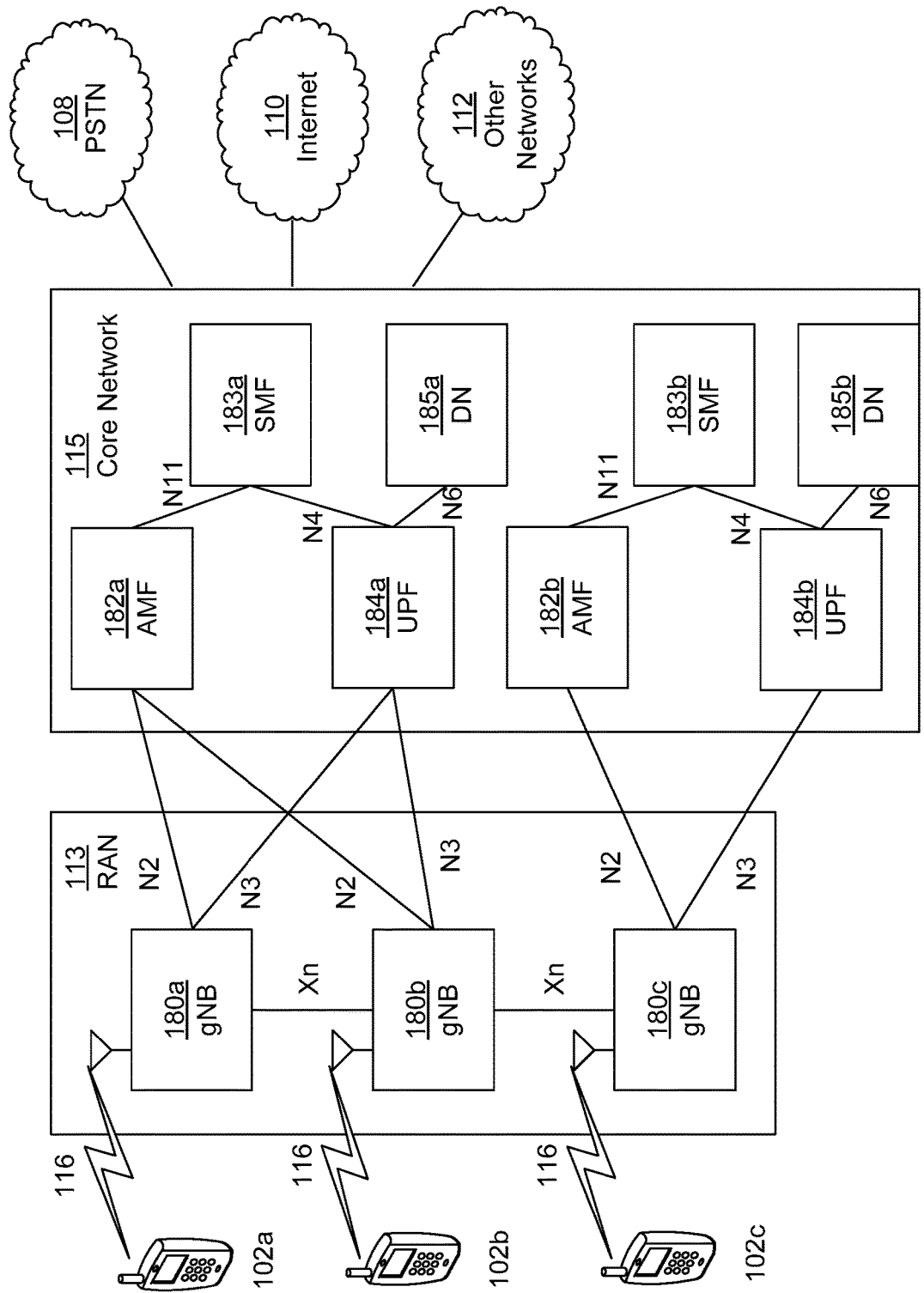
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2A:
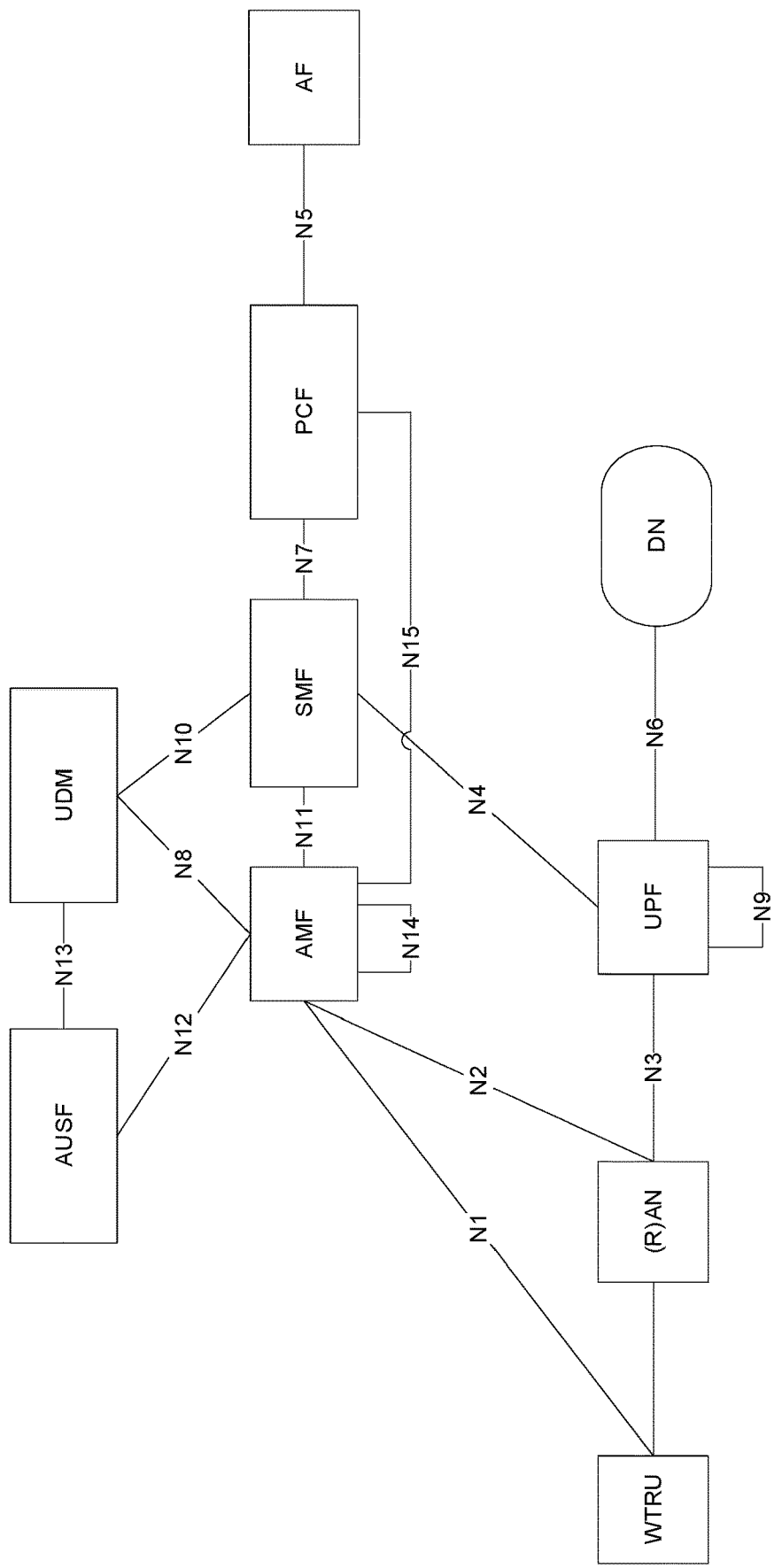
FIG. 2A illustrates an example model of a 5G/NG network.

FIG. 2A illustrates an example model architecture for 5G and/or NG network. A RAN may be based on a 5G radio access technology (RAT) and/or an evolved E-UTRA that may connect to a NG core network.

An access control and mobility management function (AMF) may include functionality for registration management, connection management, reachability management, mobility management, and/or the like.

A session management function (SMF) may include functionality for session management, session establishment, session modification, session release, WTRU IP address allocation, selection and/or control of UP function(s), and/or the like.

A user plane function (UPF) may include functionality for packet routing, packet forwarding, packet inspection, traffic usage reporting, and/or the like.

A WTRU may establish a PDU session(s) for data delivery. For example, a WTRU may establish a PDU session(s) for data delivery after registration to a network (e.g., 5G network). If, for example, the WTRU is in idle status, has mobile originated (MO) data, and/or has mobile terminated (MT) data delivery, the WTRU may perform a service request procedure. The WTRU may perform a service request procedure that may establish a user plane for data delivery. The WTRU and/or network may use the user plane (e.g., delivering up-link/down-link (UL/DL) data).

Figure 2B:
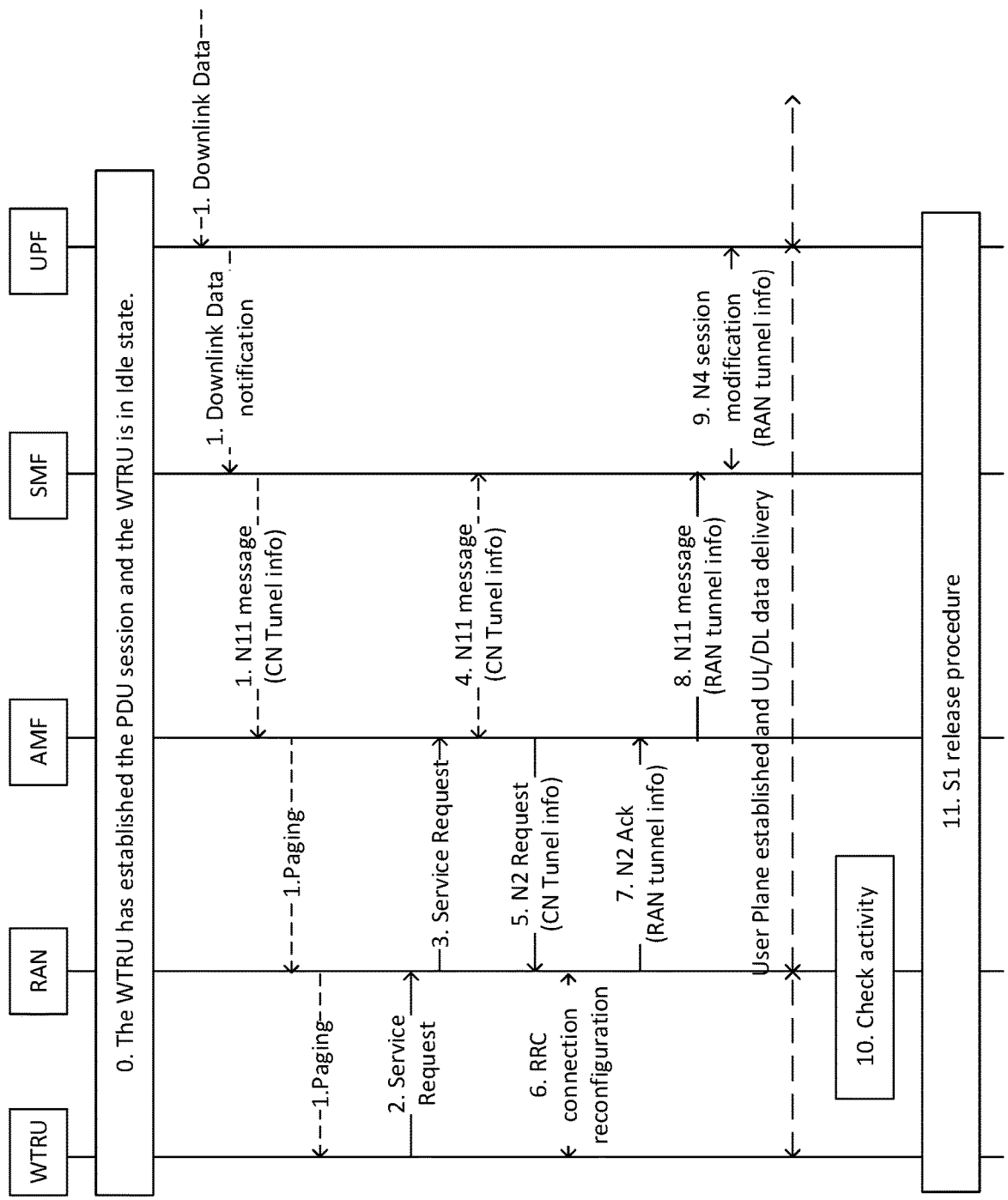
FIG. 2B illustrates an example service request procedure.

FIG. 2B illustrates an example service request procedure. The numbers shown in FIG. 2B may be present for the purpose of the reference. As such, the numbered actions may be performed in a different order (e.g., in whole or in part) that as shown in FIG. 2B. As seen in FIG. 2B, MT data delivery may be performed (e.g., shown in numbered action 1). As seen in FIG. 2B, a user plane between a WTRU and a RAN and/or between a RAN and a UPF may be established.

Figure 3:
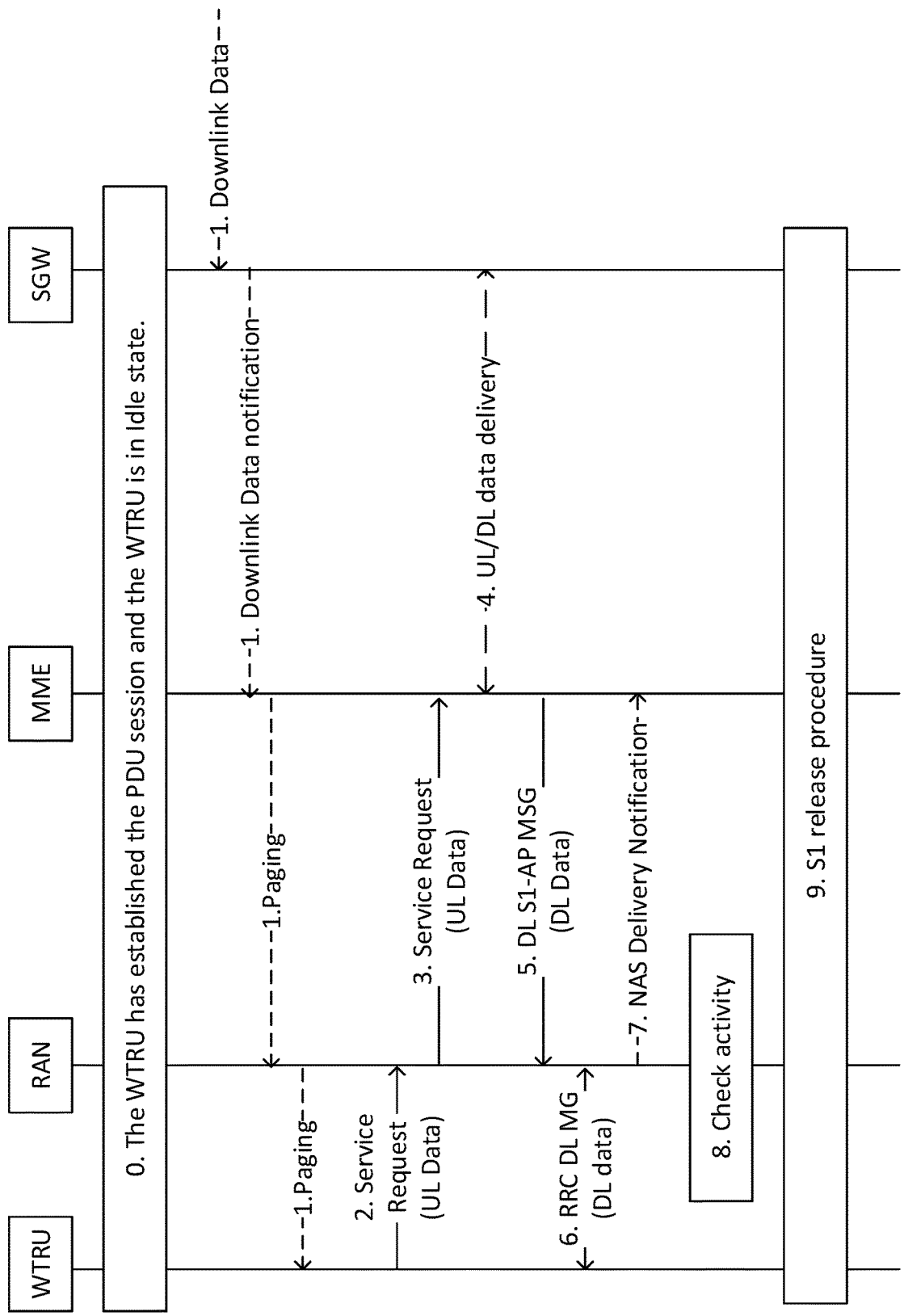
FIG. 3 illustrates an example control plane internet of things (IoT) optimization.

An evolved packet core (EPC) network may use IoT optimization. For example, in control plane IoT optimization, a WTRU and/or a network may deliver UL/DL data through NAS signaling. FIG. 3 illustrates an example control plane IoT optimization. The numbers shown in FIG. 3 may be present for the purpose of the reference. As such, the numbered actions may be performed in a different order (e.g., in whole or in part) that as shown in FIG. 3.

For example, in a user plane IoT optimization/inactive mode, a WTRU and/or a RAN may suspend a user plane. A WTRU and/or a RAN may suspend a user plane when the WTRU enters an idle mode and/or an inactive mode. If, for example, a WTRU has uplink (UL) data to deliver, the WTRU may send a resume request message to the RAN (e.g., and/or skip signaling for user plane establishment). The resume request message may be referred to as a connection resume message and/or may be an RRC message. The RAN may resume the user plane.

Figure 4:
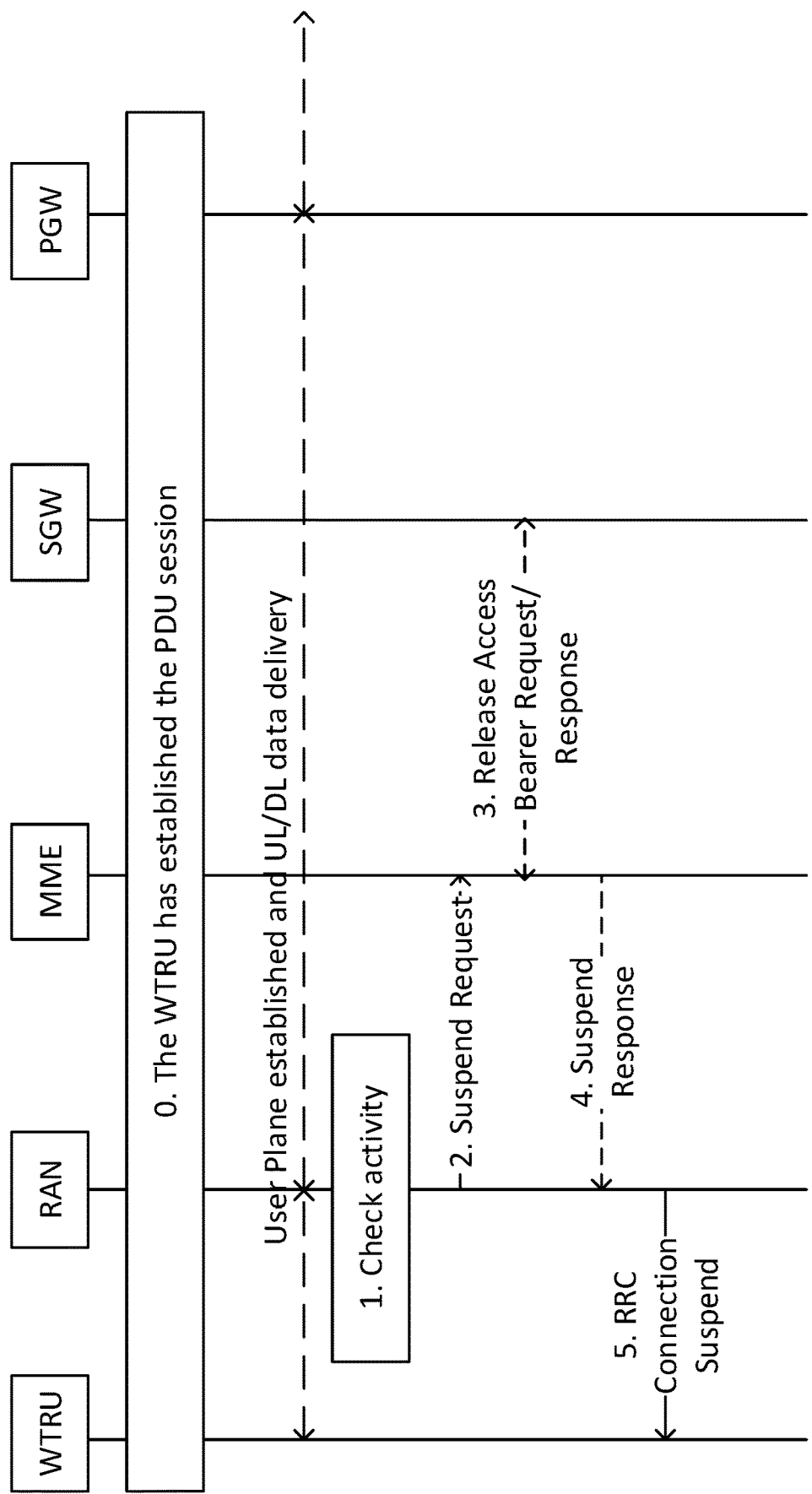
FIG. 4 illustrates an example user plane suspension procedure.

User plane IoT optimization and/or inactive mode may support suspending and/or resuming a user plane session that had been suspended. The inactive mode may be transparent to a core network (e.g., the core network may be unaware that the WTRU is in inactive mode and/or has a suspended user plane). FIG. 4 illustrates an example user plane suspend procedure. The numbers shown in FIG. 4 may be present for the purpose of the reference. As such, the numbered actions may be performed in a different order (e.g., in whole or in part) that as shown in FIG. 4. One or more numbered actions shown in FIG. 4 may or may not be performed. For example, the suspend request, the release access bearer request and response, and/or the suspend response may be skipped for inactive mode.

Figure 5:
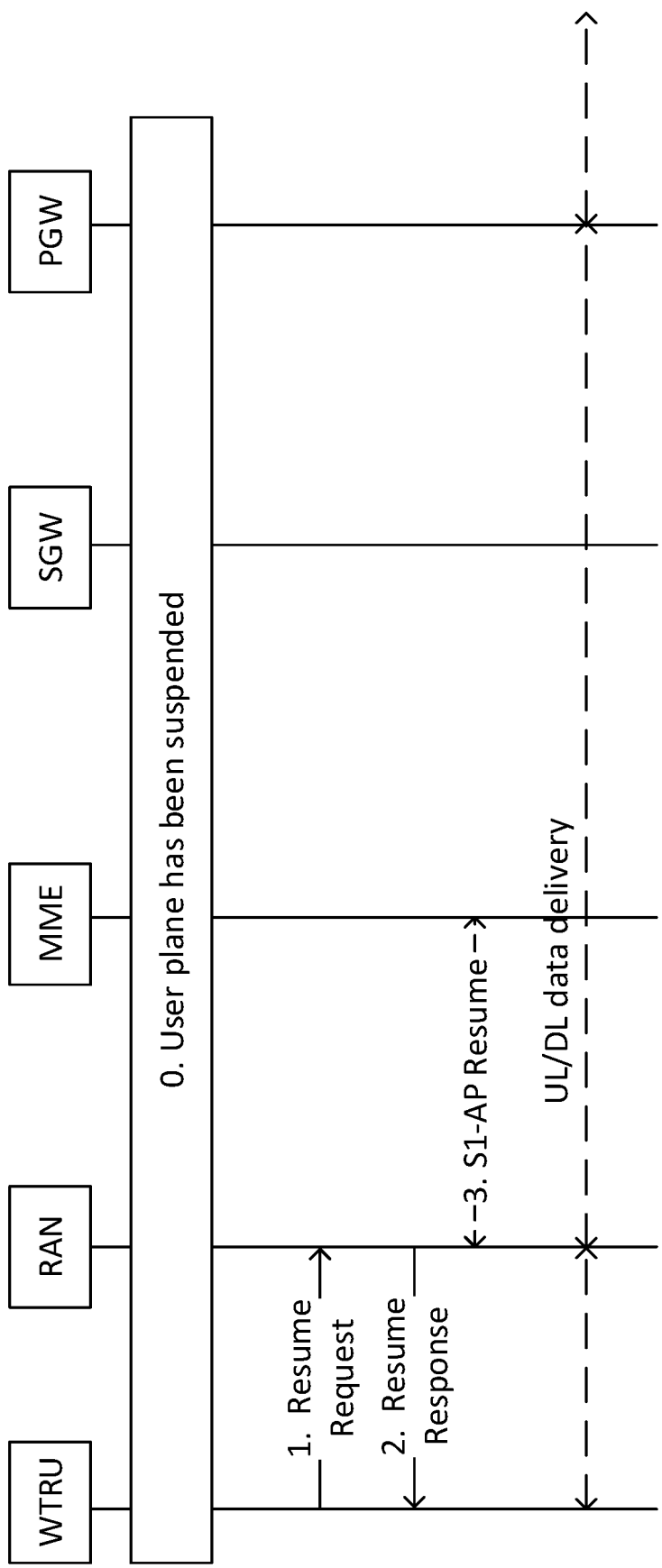
FIG. 5 illustrates an example user plane resume procedure.

FIG. 5 illustrates an example user plane resume procedure. The numbers shown in FIG. 5 may be present for the purpose of the reference. As such, the numbered actions may be performed in a different order (e.g., in whole or in part) that as shown in FIG. 5. One or more numbered actions shown in FIG. 5 may or may not be performed. For example, a S1-AP resume message may not be sent for inactive mode.

A mobility management entity (MME) may use one or more different paging strategies. For example, a MME may use paging retransmission schemes, determining whether to send a paging message to the eNodeBs during a MME high load condition(s). A MME may use one or more different paging strategies for a downlink (DL) NAS with data and/or a DL NAS with signaling (e.g., PDU session modification request). In an EPC network, a MME may store a session management context and/or a mobility management context. Storing a session management context and/or a mobility management context by a MME may allow the MME to determine paging strategies. In examples, in 5G core (5GC), an AMF may have session information. In examples, in 5GC, an AMF may not have session information. For example, in 5GC, an AMF may not have session information to determine paging strategies.

A WTRU may expect to release a NAS signaling connection to enter an idle start. This may occur after completing a transaction (e.g., each transaction) with an IoT server. In an EPC network, a WTRU may indicate to a MME that there may be DL data (e.g., further expected DL data). In examples, the MME may release a NAS signaling connection. In examples, the MME may not release a NAS signaling connection based on the indication from the WTRU and/or session management state (e.g., DL data buffering). In examples, in 5GC, an AMF may have session information. In examples, in 5GC, an AMF may not have session information. For example, in 5GC, an AMF may not have session information to determine whether or not to release a NAS signaling connection.

A WTRU may support control plane IoT optimization and/or may use a user plane to deliver data. For example, the WTRU may use the user plane to deliver data (e.g., a large amount of data).

A WTRU may enter an inactive state. If a WTRU enters an inactive state, a RAN may not notify a 5GC network that the WTRU is in the inactive state. A SMF may release the user plane by a CN-initiated deactivation of the UP connection procedure. A SMF may release a PDU session. For example, the PDU session may be released if a PDU session is inactive for a period. The period may be pre-configured. If the WTRU is in the inactive state and the 5GC (e.g., SMF, AMF, and/or the like) releases a PDU session, the PDU session context(s) stored in a RAN and/or a network may not match the PDU session contexts stored in the WTRU.

A serving/anchor RAN may receive a NAS signaling. The NAS signaling may include IoT data. When the serving/anchor RAN receives a NAS signaling and/or finds that the WTRU is in RRC_INACTIVE state, the serving/anchor RAN may buffer the NAS signaling and/or page the WTRU. Paging may occur in the RAN paging area associated with the WTRU. The WTRU may receive the paging and/or may access the RAN. For example, the WTRU may receive the paging and/or may access the RAN to resume its RRC connection. When the WTRU receives the paging and/or accesses the RAN, the WTRU may access the serving/anchor RAN and/or the WTRU may access another RAN. The WTRU may access another RAN if, for example, the WTRU roams away from the serving/anchor RAN. The RAN (e.g., current RAN) may retrieve the WTRU context and/or the buffered NAS signaling, which may include the IoT data, from the anchor RAN. The new RAN may become a serving RAN. The serving RAN may initiate a N2 path switch procedure towards the CN. If, for example, there is no on-going user plane traffic and/or if there is no active PDU session, the WTRU may not remain in a RRC_CONNECTED. The WTRU may be put back to a RRC_INACTIVE state. When the WTRU is paged for control plane (CP) data, the WTRU may have roamed to another RAN (e.g., another new RAN). The N2 path switch and/or related CN signaling/procedure may serve a previous RAN (e.g., before the WTRU roamed to another new RAN).

A serving RAN change and/or N2 path switch may occur during mobile originated (MO) data delivery. If, for example, a WTRU sends a small amount data for the UL and/or the WTRU does not expect a large amount of data to follow, the WTRU may switch to an inactive state. A serving RAN change and/or N2 path switch may be skipped (e.g., may not occur).

A SMF may indicate to an AMF that DL NAS signaling may be used for DL data and/or signaling. The AMF may make one or more paging strategies based on the indication from the SMF.

Figure 6:
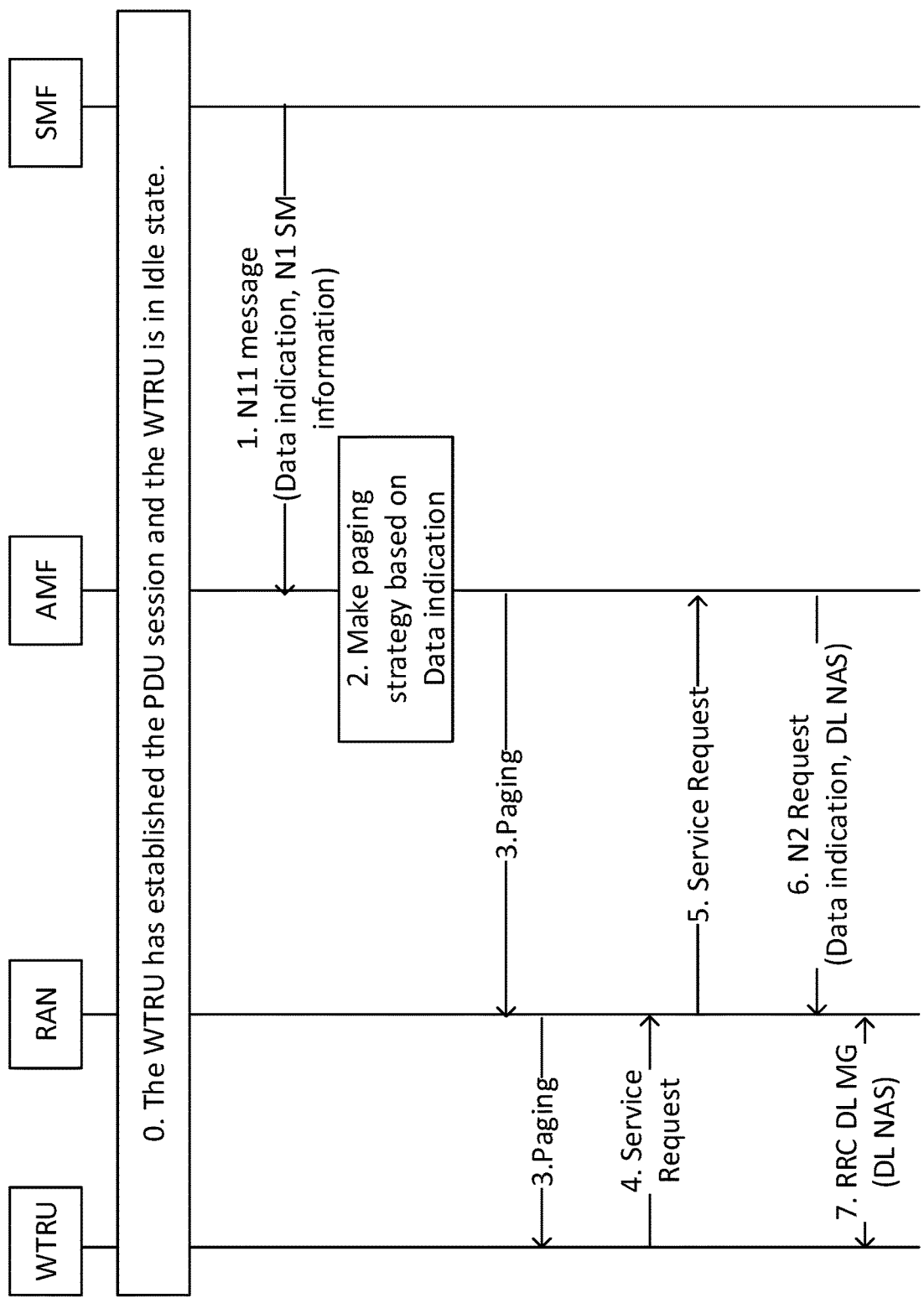
FIG. 6 illustrates an example network (NW) initiated service request procedure.

FIG. 6 illustrates an example NW-initiated service request procedure. The numbers shown in FIG. 6 may be present for the purpose of the reference. As such, the numbered actions may be performed in a different order (e.g., in whole or in part) that as shown in FIG. 6. As seen in FIG. 6, a SMF may include DL data into N1 session management (SM) information, which may be indicated by a data indication within the N11 message. An AMF may determine that the N11 message received from SMF is related to a NAS for data delivery. The AMF may make one or more paging strategies, which may be according to the data indication within the N11 message. The AMF may send one or more paging messages to a RAN. The RAN may perform paging. For example, the RAN may perform paging to a WTRU. A data over NAS indication may be included in the paging request message. A WTRU may respond to the paging from the RAN. For example, the WTRU may send a service request to the RAN. The RAN may forward the service request from the WTRU to the AMF. The AMF may include the N1 SM information in the DL NAS (e.g., service accept). The AMF may include a data indication in a N2 request message. The RAN may schedule the radio resource for DL NAS, which may be based on the data indication in the N2 request message. A NAS message with user data and/or a NAS message for signaling may have different priorities when congestion occurs in a RAN. The NAS messages (e.g., the NAS message user data and the NAS message for signaling) may use a control plane (CP) resource. The RAN may forward the DL NAS to the WTRU.

The procedure of FIG. 6 may be used when the WTRU is in a RRC inactive state. For example, an AMF may include a data over NAS indication to a RAN, e.g., in a N2 message. The RAN may determine a paging policy for RAN based paging in a RRC_Inactive scenario (e.g., based on the data over NAS indication).

In examples, a WTRU may indicate to an AMF that there may or may not be further DL NAS signaling. A SMF may indicate to the AMF that there may be suspended DL NAS signaling and/or data for the WTRU. The AMF may decide to release a NAS signaling connection. For example, the AMF may decide to release a NAS signaling connection if there is no DL NAS from the WTRU (e.g., no expected DL NAS from the WTRU) and/or there is no a suspended DL NAS from the SMF.

Figure 7:
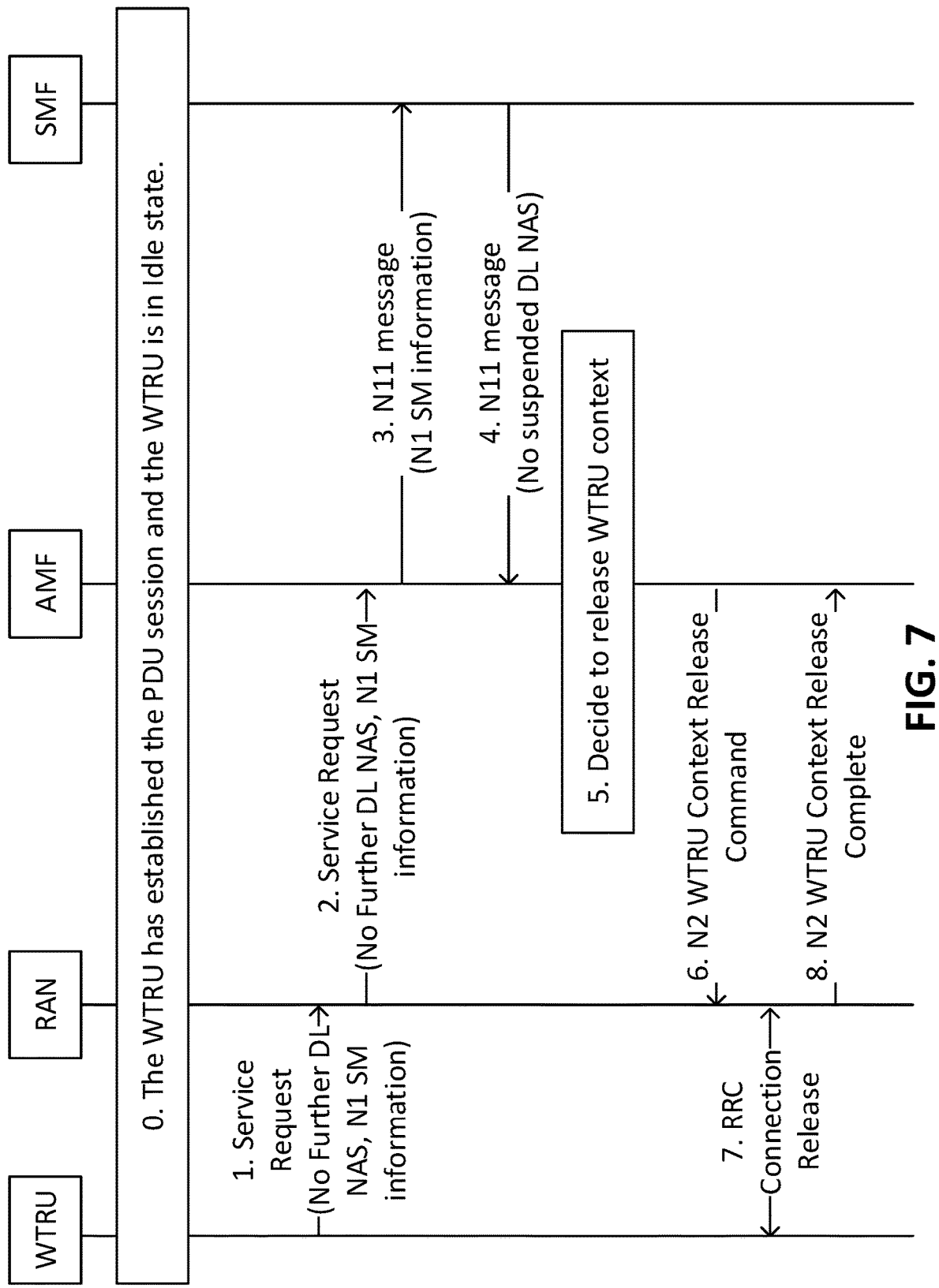
FIG. 7 illustrates an example non-access stratum (NAS) signaling connection release based on an indication from a WTRU and/or a SMF.

FIG. 7 illustrates an example NAS signaling connection release. The numbers shown in FIG. 7 may be present for the purpose of the reference. As such, the numbered actions may be performed in a different order (e.g., in whole or in part) that as shown in FIG. 7. As seen in FIG. 7, NAS signaling connection release may be based on an indication from a WTRU and/or a SMF. For example, a WTRU may send a service request to a RAN. The service request may include N1 SM information (e.g., UL data) and/or may indicate there may not be further DL NAS. The RAN may send the service request to an AMF. In examples, the service request from the RAN to the AMF may include N1 SM information (e.g., UL data) and/or may indicate there may not be further DL NAS. The AMF may send a N11 message to a SMF, which may include N1 SM information (e.g., UL data). The SMF may send a N11 message to the AMF. For example, the SMF may indicate to the AMF that there may not be a suspended DL NAS from the SMF. The SMF may indicate to the AMF that there may not be buffered NAS signaling and/or DL data. The AMF may determine to release the NAS connection (e.g., WTRU context), e.g., based on the received information from the SMF. The AMF may collect the indications (e.g., messages 1, 2, and/or 4 of FIG. 7). The indication may be used to determine whether to release a NAS connection. For example, a NAS connection may be released if the WTRU does not expect a DL NAS and/or if there is not a suspended NAS from a SMF (e.g., any SMF). The AMF may send a N2 WTRU context release command to the RAN. The RAN may release the related RRC connection. The RAN may send a completion message to the SMF.

In examples, a WTRU may indicate to a SMF that there may or may not be further DL data (e.g., further expected DL data). The SMF may indicate to an AMF that there may not be further NAS signaling. This indication may be based on the indication from the WTRU and/or local information. For example, local information may include suspended DL NAS, buffered DL data, and/or the like. The AMF may decide to release the NAS signaling connection. For example, the AMF may decide to release the NAS signaling connection if there is no further NAS signaling.

Figure 8:
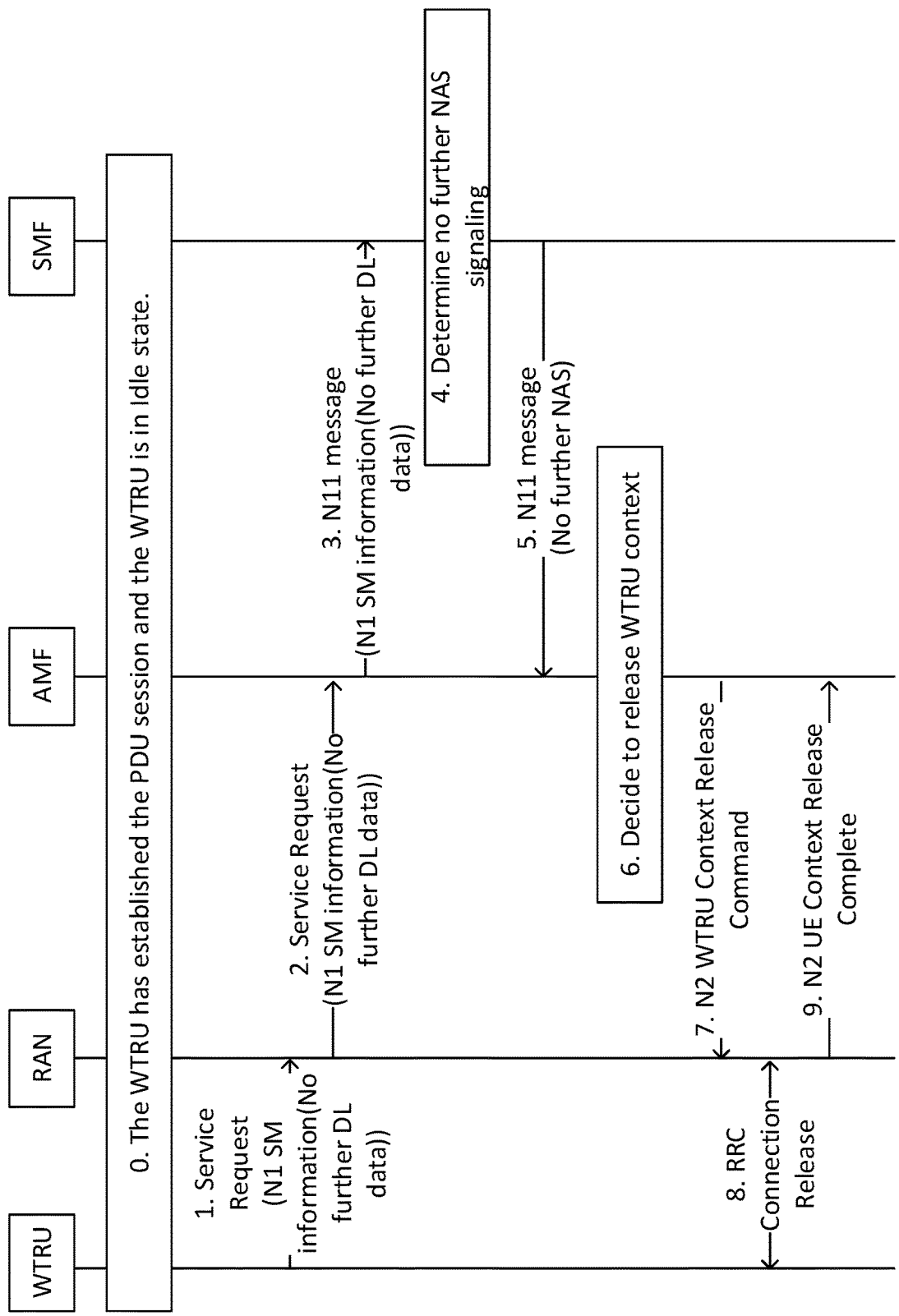
FIG. 8 illustrates an example NAS signaling connection release based on an indication from a SMF.

FIG. 8. Illustrates an example NAS signaling connection release. The numbers shown in FIG. 8 may be present for the purpose of the reference. As such, the numbered actions may be performed in a different order (e.g., in whole or in part) that as shown in FIG. 8. As seen in FIG. 8, the NAS signaling connection release may be based on an indication from a SMF. For example, a WTRU may send a service request to a RAN. The service request may include N1 SM information (e.g., UL data and/or a DL data indication). The indication may be sent in a SM container, which may be transparent to the AMF. The RAN may send service requests to the AMF. The AMF may send a N11 message to a SMF, which may include N1 SM information (e.g., UL data and/or a DL data indication). In examples, the SMF may determine that there may be further NAS signaling. In examples, the SMF may determine that there may not be further NAS signaling. For example, the SMF may determine that there is no further NAS signaling based on one or more of the following: an indication from the WTRU indicating that there is no further DL data; the SMF having no buffered DL data; signaling based on the received indication from the WTRU in the SM message; and/or its own determination that there may be pending DL signaling and/or data for the WTRU. If, for example, the SMF determines that there may be no further NAS signaling, the SMF may indicate that determination to the AMF. For example, the SMF may indicate to the AMF that there may not be further NAS signaling for the WTRU. The AMF may determine to release the WTRU context. For example, the AMF may determine to release the WTRU context, for example, if there is no further NAS signaling from the SMF and/or any SMF. The AMF may send a N2 WTRU context release command to the RAN. The RAN may release a related RRC connection. The RAN may send a completion message to the SMF.

Figure 9:
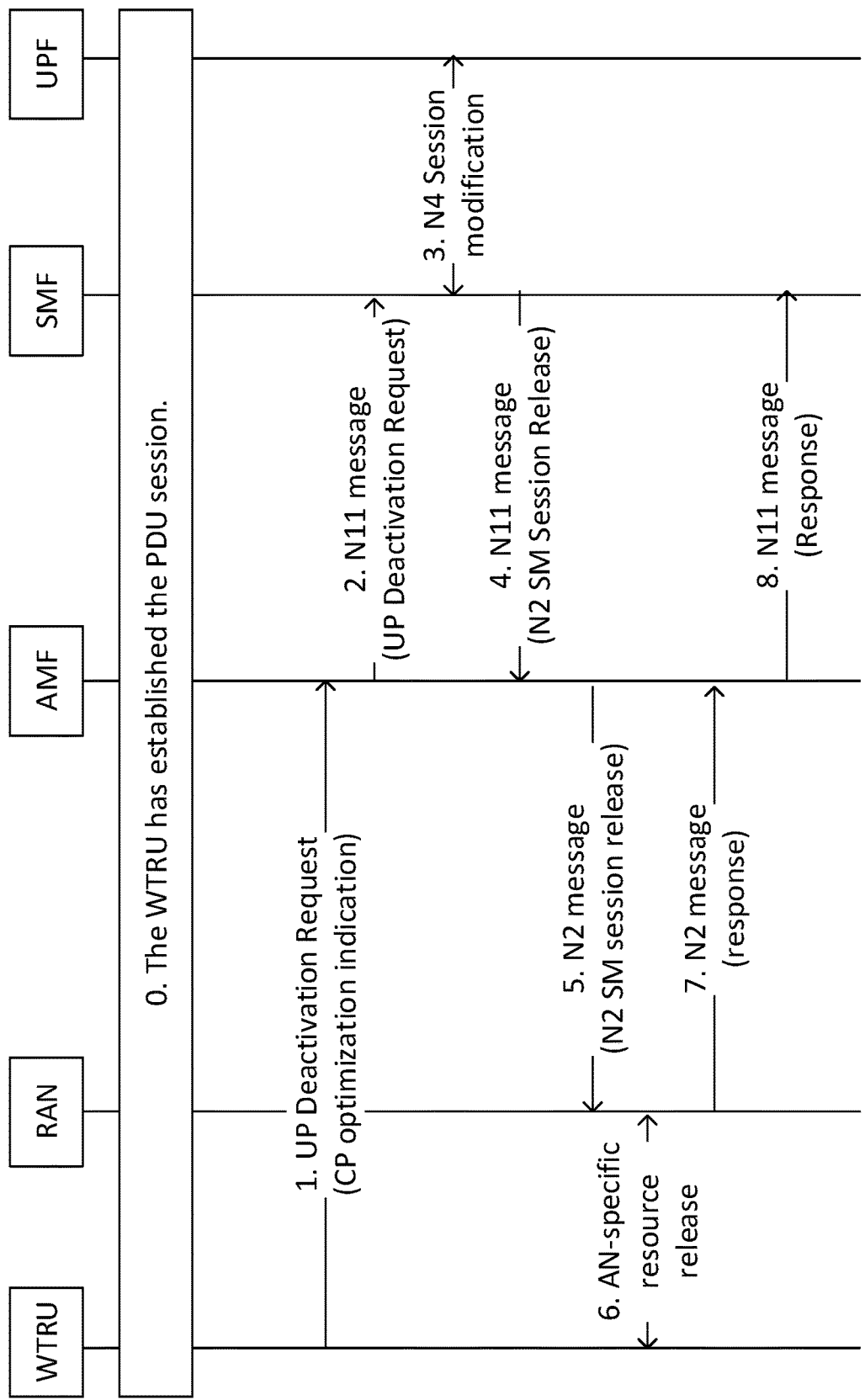
FIG. 9 illustrates an example WTRU initiated deactivation of a user plane (UP) connection.

A WTRU may send a request to a SMF to deactivate a user plane (UP) connection and/or may indicate a switch to control plane IoT optimization. FIG. 9 illustrates an example WTRU-initiated deactivation of a UP connection. The numbers shown in FIG. 9 may be present for the purpose of the reference. As such, the numbered actions may be performed in a different order (e.g., in whole or in part) that as shown in FIG. 9. As seen in FIG. 9, a WTRU may trigger a WTRU-initiated deactivation of a UP connection. For example, a WTRU may trigger a WTRU-initiated deactivation of a UP connection by transmitting a NAS message. The NAS message may include N1 SM information, a UP deactivation request, and/or a PDU session ID. The UP deactivation request may include a control plane (CP) optimization indication. The UP deactivation request may include a CP optimization indication if, for example, a CP (e.g., NAS) is used for future data delivery. An AMF may determine if, for example, a SMF is impacted by the UP deactivation request. The determination of AMF to identify a SMF impacted by the UP deactivation request may be based on the PDU session ID. The AMF may send a N11 message to the SMF. The N11 message may include N1 SM information, a UP deactivation request, and/or a PDU session ID.

The SMF may determine whether or not to accept the UP deactivation request from the WTRU. For example, the SMF may determine to accept the UP deactivation request from the WTRU based on a configuration and/or a user subscription. The SMF may notify a UPF to remove RAN tunnel information. The SMF may forward the UP deactivation request indication to the UPF. In examples, the SMF may forward the UP deactivation request indication to the UPF to inform the UPF that data for the connection may be transferred over a N4 interface. In examples, the SMF may forward the UP deactivation request indication to the UPF to inform the UPF that data for the connection may not be transferred over a N3 interface.

The UPF may determine not to release the network layer address (e.g., IPv4 address, IPv6 prefix, and/or any non-IP address) for the WTRU. The UPF may determine not to release the network layer address for the WTRU, e.g., based on the UP deactivation request indication. The UPF may store other WTRU contexts. For example, the UPF may store other WTRU contexts, such as quality of service (QoS) rules and/or the like for the session associated with the WTRU.

The SMF may send a N11 message. The N11 message may include a N2 SM session release request. The N11 message, including a N2 SM session release request, may be a request to release RAN resources. The RAN resources may be associated with a PDU session. The AMF may forward the received N2 SM session release request to a RAN. The RAN may issue access network (AN) specific signaling exchanges with the WTRU. For example, the RAN may issue AN-specific signaling exchanges with the WTRU to release the user plane resources of the RAN, which may be associated with the PDU session.

The SMF may acknowledge the UP deactivation request, e.g., by NAS signaling. The WTRU may keep the PDU session context and/or may use the same PDU session ID in the NAS SM message when the WTRU sends data over NAS (e.g., a NAS SM message). For example, the WTRU may send data over NAS after receiving acknowledgement (e.g., NAS acknowledgement) from the SMF. The RAN may acknowledge the N2 session release request, for example, by sending a N2 PDU session response to the AMF. The AMF may send a N11 message, for example, to acknowledge the SM request received from the SMF.

Figure 10:
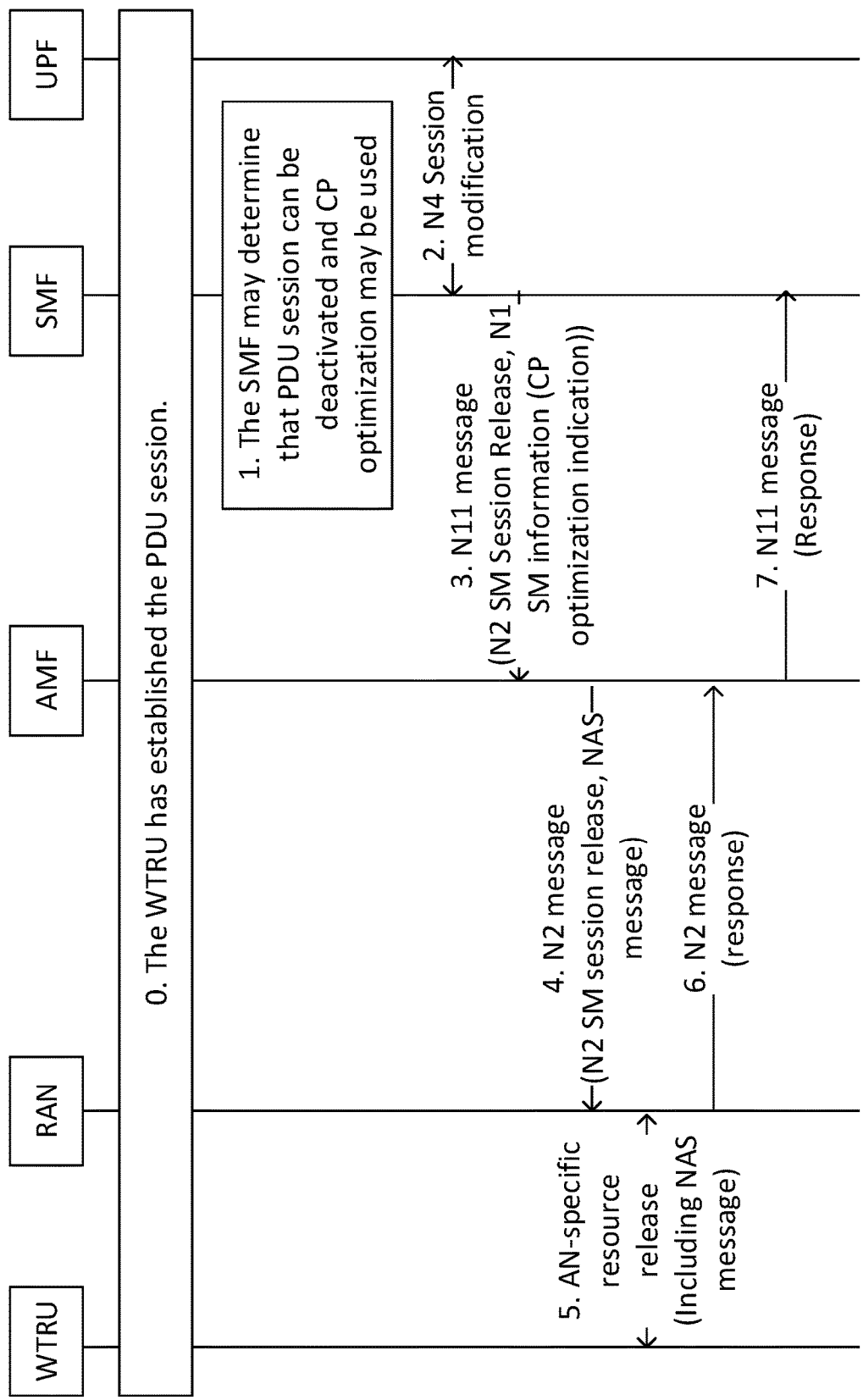
FIG. 10 illustrates an example core network (CN) initiated deactivation of a UP connection.

A SMF may deactivate the user plane and/or determine to switch to control plane IoT optimization. FIG. 10 illustrates an example CN-initiated deactivation of a UP connection. The numbers shown in FIG. 10 may be present for the purpose of the reference. As such, the numbered actions may be performed in a different order (e.g., in whole or in part) that as shown in FIG. 10. As seen in FIG. 10, a SMF may determine to deactivate a UP connection of a PDU session. For example, the SMF may determine that a PDU session may be deactivated and/or CP optimization may be used. The SMF may determine to switch to CP optimization for future data delivery. For example, the determination to switch the SMF to CP optimization for future data delivery may be based on, for example, no data activity for a configured period and/or a WTRU supporting CP optimization.

The SMF may notify a UPF to remove RAN tunnel information. The SMF may forward a UP deactivation request indication to the UPF. In examples, the SMF may forward a UP deactivation request indication to the UPF to inform the UPF that data for this connection may be transferred over a N4. In examples, the SMF may forward a UP deactivation request indication to the UPF to inform the UPF that data for this connection may not be transferred over a N3 interface. The UPF may determine not to release the network layer address (e.g., IPv4 address, IPv6 prefix and/or a non-IP address) for the WTRU. The determination not to release the network layer address for the WTRU may be based on the UP deactivation request indication. The UPF may store a WTRU context (e.g., QoS rules and/or the like) for a WTRU session.

A SMF may send a N11 message. The message may include a N2 SM session release request and/or N1 SM information (e.g., CP optimization indication). The N2 SM session release request may release RAN resources, which may be associated with a PDU session. N1 SM information that includes a CP optimization indication, may indicate to a WTRU that future data delivery may use the control plane (e.g., NAS signaling). The WTRU may deliver data using the control plane.

An AMF may forward a N2 SM session release request and/or a NAS message to a RAN. For example, an AMF may forward a N2 message that may include N1 SM information. The N1 SM information may include a CP optimization indication.

A RAN may issue an access network (AN) specific signal to a WTRU. For example, the AN-specific signal may release RAN resources associated with a PDU session. The RAN may forward a NAS message to the WTRU. The NAS message may include a PDU session ID. The WTRU, upon receiving the NAS message, may keep a PDU session context and/or may use the PDU session ID when it sends data over NAS (e.g., a NAS SM message). The WTRU may use NAS signaling to send data to the network. For example, the WTRU may use NAS signaling to send data to the network if the WTRU has uplink data for the received PDU session ID. The RAN may acknowledge the N2 session release request. For example, the RAN may acknowledge the N2 session release request by sending a N2 PDU session response to the AMF.

The AMF may send an N11 message. The N11 message may acknowledge a SM request from an SMF. An example message is illustrated in message 7 of FIG. 10.

A RAN may remove UP resource locally. For example, a RAN may remove UP resource locally without notifying a WTRU. If, for example, the WTRU is inactive, a RAN may remove UP resource locally without notifying a WTRU during a CN-initiated deactivation of a UP connection and/or a PDU session release procedure. A WTRU may attempt to resume a connection with the RAN. The RAN may indicate a confirmation. For example, the RAN may indicate a confirmation by sending the resumed PDU session IDs to the WTRU. The confirmation may indicate, to the WTRU, the PDU sessions that are resumed. For example, the confirmation may indicate, to the WTRU, the PDU sessions that are resumed by sending a synchronization indication to the WTRU. Sending a synchronization indication to the WTRU may trigger a registration procedure and/or a service request procedure, which may synchronize the PDU session state with the network.

Figure 11A:
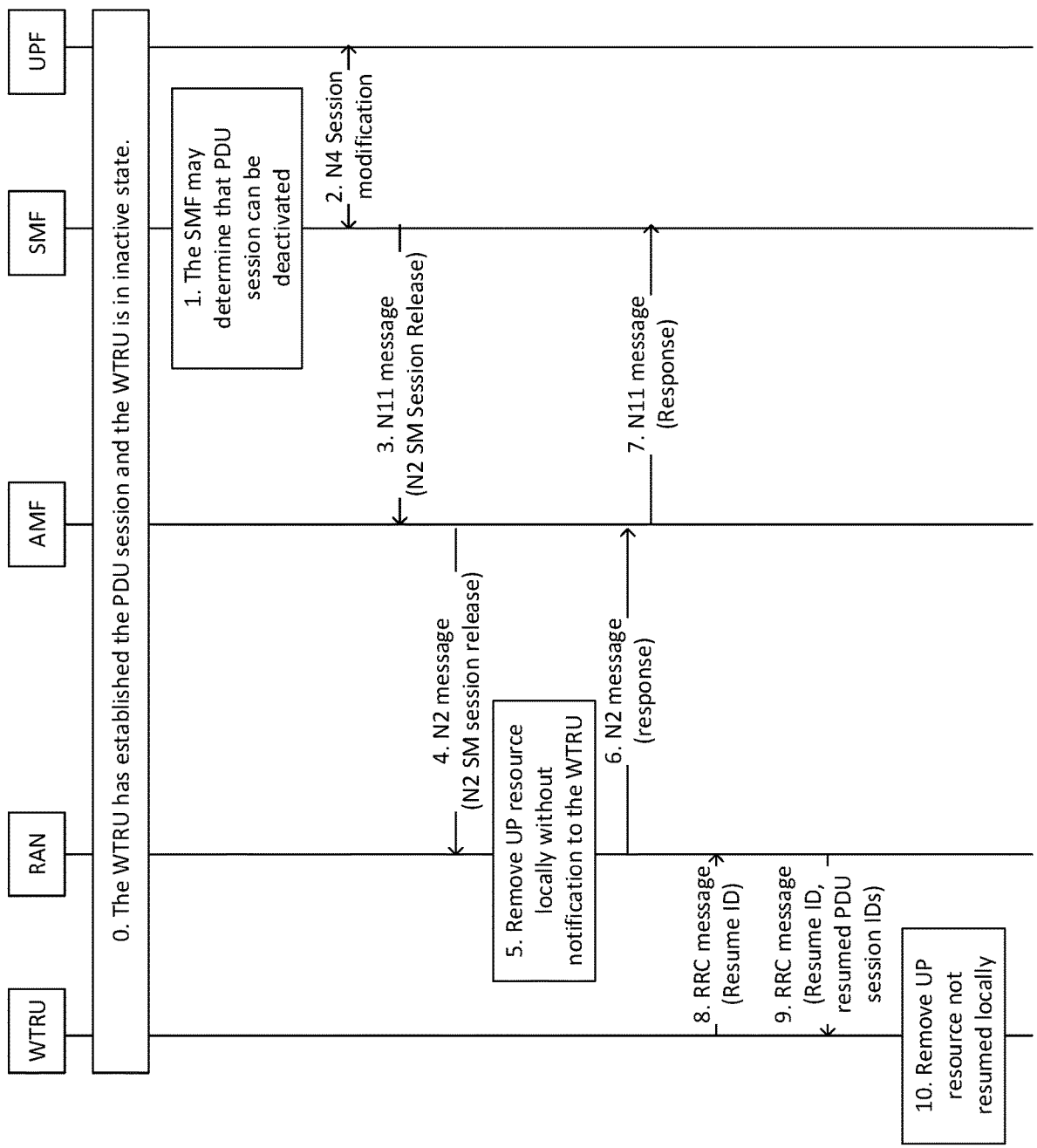
FIG. 11A illustrates an example protocol data unit (PDU) session context synchronization, e.g., during a resume procedure.

FIG. 11A illustrates an example PDU session context synchronization. The numbers shown in FIG. 11A may be present for the purpose of the reference. As such, the numbered actions may be performed in a different order (e.g., in whole or in part) that as shown in FIG. 11A. As seen in FIG. 11A, a PDU session context synchronization may be done during a resume procedure. For example, a SMF may deactivate a UP connection of a PDU session and/or release a PDU session. The SMF may notify a UPF to remove RAN tunnel information. The SMF may notify the UPF to remove tunnel resource(s) and/or context(s) with a N4 session. The SMF may send a N11 message, which may include a N2 SM session release request and/or a PDU session release command. The N2 SM session release request may be a request to release the RAN resources associated with a PDU session.

An AMF may forward the N2 SM session release request and/or a PDU session release command to a RAN. The AMF may include an indication to the RAN. For example, the AMF may include an indicator (e.g., skip indicator), which may indicate to the RAN to locally deactivate a UP resource. An indicator (e.g., a skip indicator) may inform the RAN to locally deactivate a UP resource if a WTRU is in RRC_Inactive state. An indicator (e.g., a skip indicator) may inform the RAN to locally deactivate a UP resource without notifying a WTRU. For example, the RAN may deactivate UP resources without notifying the WTRU, if the WTRU is in RRC_Inactive state. The RAN may remove UP resources locally. The RAN may remove UP resources locally without notifying a WTRU. For example, the RAN may remove UP resources locally if the WTRU is in RRC_Inactive state.

A RAN may acknowledge a N2 session release request, for example, by sending an N2 PDU session response to an AMF. The AMF may send a N11 message to acknowledge the SM session release request.

A WTRU may establish one or more PDU sessions via a RAN node. A WTRU may transition into an inactive state. For example, the WTRU may transition into an inactive state after establishing one or more PDU sessions via a RAN node. A WTRU may attempt a connection resume procedure (e.g., from the inactive state), e.g., via resume connection message. For example, the WTRU may provide a resume ID to a RAN. The RAN may use the provided resume ID, for example, to access the stored context associated with the WTRU.

The RAN may send an acknowledgement to the WTRU. In examples, the RAN may send an acknowledgement to the WTRU that the WTRU has entered a radio resource control (RRC) connected state. The RAN may indicate a resumed PDU session(s). In examples, the RAN may indicate a resumed PDU session(s) by sending the resumed PDU session ID(s) to the WTRU. In examples, the RAN may send a message to the WTRU. The message may indicate a subset of the one or more PDU sessions that are available when the WTRU resume connection with the RAN. The RAN may indicate, to the WTRU, to perform a PDU session synchronization with a core network (e.g., AMF and/or SMF). The RAN may indicate, to the WTRU, to perform a PDU session synchronization with the core network if a skip indicator is received.

In examples, the RAN may indicate, to the WTRU, a removed PDU session(s). For example, the RAN may indicate, to the WTRU, a removed PDU session(s) by sending the WTRU the removed PDU session ID(s). In examples, the RAN may indicate active data radio bearers (DRBs) to a WTRU. In examples, the RAN may not indicate active DRBs to a WTRU. For example, if the WTRU receives a message from the RAN (e.g., message 9 of FIG. 11A), which does not include DRB information associated with a removed PDU session, the WTRU may deactivate the PDU session. For example, the WTRU may locally deactivate the PDU session (e.g., as shown in message 10 of FIG. 11A).

A WTRU may deactivate (e.g., remove) one or more UP resources that are not resumed. For example, a WTRU may remove one or more UP resources that are not resumed based on an indication from the RAN. The WTRU may deactivate one or more established PDU sessions of the plurality of PDU session. For example, the WTRU may deactivate one or more established PDU sessions of the plurality of PDU session based on the message from the RAN. As described herein, the message from the RAN indicates the subset of the plurality of PDU sessions that are available.

The WTRU(s) may transition to an idle state. The WTRU may perform a registration procedure and/or a service request procedure with the network. For example, the WTRU may perform a registration procedure (e.g., new registration procedure) and/or a service request procedure (e.g., a new service request procedure) with the network if, for example, the WTRU determines to perform a PDU session synchronization. For example, the registration procedure and/or the service request procedure may synchronize the PDU session states with the network.

A RAN may remove UP resource locally. For example, a RAN may remove UP resource locally without notifying a WTRU. If, for example, the WTRU is inactive, a RAN may remove UP resource locally during a PDU session release procedure. A WTRU may request to resume a connection with a RAN. The RAN may acknowledge the request from the WTRU and/or may resume the connection with the WTRU. The RAN may indicate, to the WTRU, that the connection has been resumed. For example, the RAN may send the WTRU the resumed PDU session ID(s). The RAN may indicate, to the WTRU, to perform a PDU session synchronization with a core network (e.g., AMF and/or SMF) as described herein.

Figure 11B:
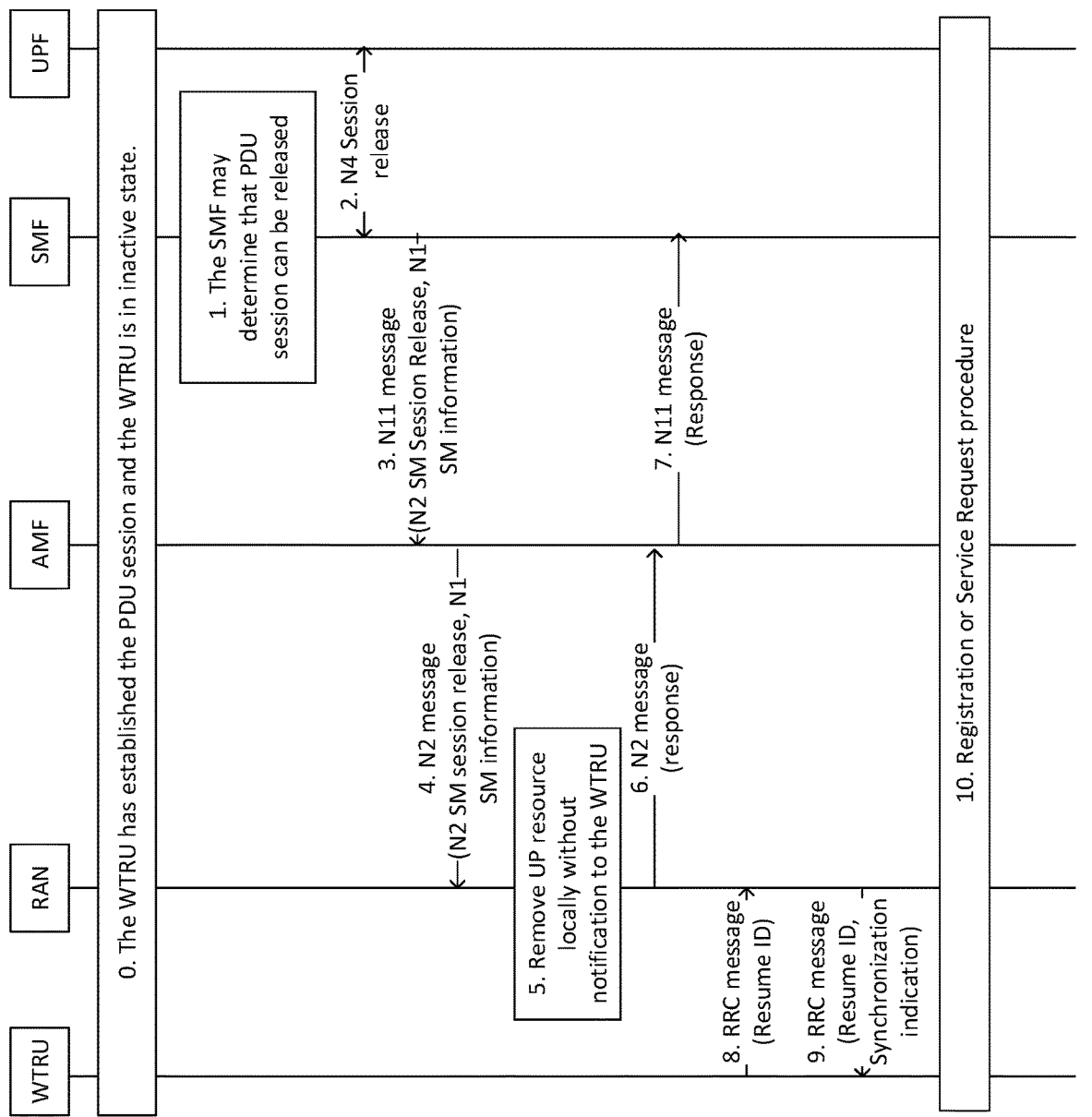
FIG. 11B illustrates an example PDU session context synchronization, e.g., after a resume procedure.

FIG. 11B illustrates an example PDU session context synchronization. The numbers shown in FIG. 11B may be present for the purpose of the reference. As such, the numbered actions may be performed in a different order (e.g., in whole or in part) that as shown in FIG. 11B. As seen in FIG. 11B, a PDU session context synchronization may be done after a resume procedure. For example, a PDU session release may occur (e.g., after resume procedure). A SMF may decides to release a PDU session. The SMF may notify a UPF to remove one or more (e.g., all) tunnel information and/or the N4 context. The SMF may send a N11 message. The N11 message may include a N2 SM session release request and/or N1 SM information (e.g., a PDU session release command).

An AMF may forward the N2 SM session release request and/or the N1 SM information to a RAN. The AMF may include an indication. For example, the indication may be a skip indicator. The indicator (e.g., skip indicator) may indicate, to the RAN, to locally release an AN resource. For example, the indicator (e.g., skip indicator) may indicate, to the RAN, to locally release an AN resource without notifying a WTRU. The skip indicator may indicate, to the RAN, to locally release an AN resource if, for example, the WTRU is in an RRC_Inactive state. The RAN may remove the AN resource. For example, the RAN may remove the AN resource without notifying the WTRU. For example, the RAN may remove the AN resource without notifying the WTRU if the WTRU is in a RRC_Inactive state. The RAN may acknowledge the N2 session release request, for example, by sending an N2 PDU session response to the AMF. The AMF may send a N11 message. The N11 message may acknowledge the SM received from the SMF.

A WTRU may establish one or more PDU sessions via a RAN node. A WTRU may transition into an inactive state. For example, the WTRU may transition into an inactive state after establishing one or more PDU sessions via a RAN node. The WTRU may attempt a connection resume procedure (e.g., from the inactive state). The WTRU may send a resume connection message (e.g., via RRC message) to a RAN node. For example, the WTRU may provide a resume ID to a RAN node, e.g., via a resume connection message. The RAN may use the provided resume ID, for example, to access the stored context associated with the WTRU.

The RAN node (e.g., or RAN) may acknowledge to the WTRU that the WTRU has entered a radio resource control (RRC) connected state. The RAN may indicate, to the WTRU, to perform synchronization with the core network. For example, the RAN node may send an acknowledgement to the WTRU. In examples, the RAN may send an acknowledgement to the WTRU that the WTRU has entered a radio resource control (RRC) connected state. The RAN may indicate a resumed PDU session(s). In examples, the RAN may indicate a resumed PDU session(s) by sending the resumed PDU session ID(s) to the WTRU. In examples, the RAN may send a message to the WTRU. The message may indicate a subset of the one or more PDU sessions that are available when the WTRU resume connection with the RAN. The RAN may indicate, to the WTRU, to perform a PDU session synchronization with a core network (e.g., AMF and/or SMF). The RAN may indicate, to the WTRU, to perform a PDU session synchronization with the core network if a skip indicator is received.

In examples, the RAN may indicate, to the WTRU, a removed PDU session(s). For example, the RAN may indicate, to the WTRU, a removed PDU session(s) by sending the WTRU the removed PDU session ID(s). In examples, the RAN may indicate active data radio bearers (DRBs) to a WTRU. In examples, the RAN may not indicate active DRBs to a WTRU. For example, if the WTRU receives a message from the RAN (e.g., message 9 of FIG. 11B), which does not include DRB information associated with a removed PDU session, the WTRU may deactivate the PDU session. For example, the WTRU may locally deactivate the PDU session (e.g., as shown in message 10 of FIG. 11B).

A WTRU may deactivate (e.g., remove) one or more UP resources that are not resumed. For example, a WTRU may remove one or more UP resources that are not resumed based on an indication from the RAN. The WTRU may deactivate one or more established PDU sessions of the plurality of PDU session. For example, the WTRU may deactivate one or more established PDU sessions of the plurality of PDU session based on the message from the RAN. As described herein, the message from the RAN indicates the subset of the plurality of PDU sessions that are available.

The WTRU(s) may transition to an idle state. The WTRU may perform a registration procedure and/or a service request procedure with the network. For example, the WTRU may perform a registration procedure (e.g., new registration procedure) and/or a service request procedure (e.g., a new service request procedure) with the network if, for example, the WTRU determines to perform a PDU session synchronization. For example, the registration procedure and/or the service request procedure may synchronize the PDU session states with the network.

A RAN may remove UP resource locally. For example, a RAN may remove UP resource locally without notifying a WTRU. If, for example, the WTRU is inactive, a RAN may remove UP resource locally during a PDU session release procedure. A WTRU may request to resume a connection with a RAN. The RAN may acknowledge the request from the WTRU and/or may resume the connection with the WTRU. The RAN may indicate, to the WTRU, that the connection has been resumed. For example, the RAN may send the WTRU the resumed PDU session ID(s). The RAN may indicate, to the WTRU, to perform a PDU session synchronization with a core network (e.g., AMF and/or SMF) as described herein.

The WTRU may perform a registration procedure and/or a service request procedure. For example, the WTRU may perform a registration procedure and/or a service request procedure to synchronize the PDU session states with the network. The WTRU may perform a registration procedure and/or a service request procedure based on the received indication (e.g., as shown in message 10 of FIG. 11B).

Figure 12:
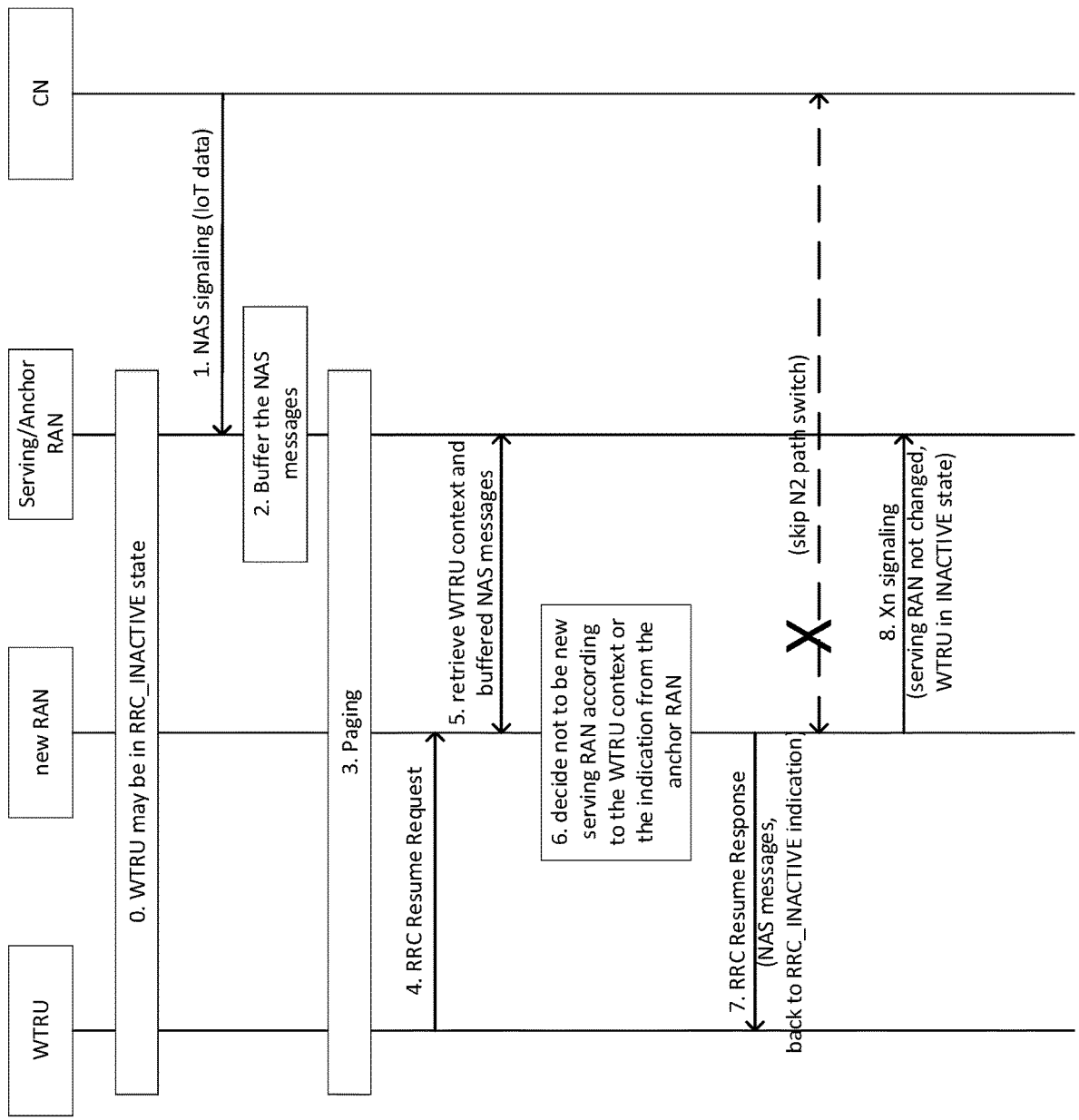
FIG. 12 illustrates an example procedure for avoiding a service RAN change and/or N2 path switch.

FIG. 12 illustrate an example procedure for avoiding a service RAN change and/or N2 path switch. The numbers shown in FIG. 12 may be present for the purpose of the reference. As such, the numbered actions may be performed in a different order (e.g., in whole or in part) that as shown in FIG. 12.

NAS signaling for mobile terminated (MT) data delivery and/or DL data via user plane may be received and/or buffered at a serving/anchor RAN (e.g., as shown in FIG.

12). For example, DL data may be received from a core network (CN), e.g., via NAS signaling and/or via user plane, and/or buffered at a serving/anchor RAN when DL data exists and/or a target WTRU is in RRC_INACTIVE state. The serving/anchor RAN node may buffer the DL data (e.g., received via the NAS signaling and/or via user plane). The serving/anchor RAN may page the WTRU. The WTRU may be paged when the WTRU is in the paging area of the RAN. If, for example, the WTRU is within the paging area of the RAN, the WTRU may access the RAN to resume RRC connection.

A WTRU may access a serving/anchor RAN to resume a RRC connection. The serving/anchor RAN may forward a buffered DL data (e.g., received via NAS signal or NAS message and/or via user plane) to the WTRU. For example, the serving/anchor RAN may forward a buffered DL data, received via NAS signal and/or via user plane, to the WTRU in a RRC message during the connection resume procedure.

A WTRU may access another RAN (e.g., a new RAN) if, for example, the WTRU has roamed away from the serving/anchor RAN. The other RAN (e.g., a new RAN) may retrieve the WTRU context and/or a buffered NAS message from the serving/anchor RAN. The other RAN (e.g., new RAN) may retrieve the WTRU context and/or buffered NAS message the serving/anchor RAN by deriving the information about the serving/anchor RAN from the RRC resume request (e.g., as shown in message 4 in FIG. 12). The resume ID may include information about the serving/anchor RAN, such as serving RAN ID. The other RAN (e.g., a new RAN) may forward the DL data (e.g., received via NAS message and/or via user plane) to the WTRU. For example, the other RAN (e.g., a new RAN) may forward the DL data (e.g., received via NAS message and/or via user plane) to the WTRU in a RRC message during the connection resume procedure. The other RAN (e.g., a new RAN) may determine whether to become the serving RAN for the WTRU. The other RAN (e.g., a new RAN) may make this determination based on one or more of the followings. In examples, if the WTRU context indicates there are no active PDU session, the other RAN (e.g., new RAN) may determine not to become a new serving/anchor RAN. In examples, if the new RAN (e.g., other RAN) receives an indication from the serving/anchor RAN (e.g., serving/anchor RAN that the WTRU was previously connected to) that the new RAN may not become the new serving/anchor RAN, the other RAN/new RAN may not become the new serving/anchor RAN. The other RAN (e.g., a new RAN) may receive the indication from the serving/anchor RAN, for example, by Xn signaling. In example, if a WTRU indicates in a RRC message (e.g., a resume request) that the WTRU may be in a non-allowed and/or forbidden, the other RAN (e.g., a new RAN) may not become a new serving/anchor RAN.

A WTRU may indicate to a new RAN that the resume procedure is triggered for small data delivery. For example, a WTRU may indicate to a new RAN that a large data may not be transferred and/or the WTRU may soon switch to an inactive state (e.g., after receiving the small data delivery). The new RAN may determine not to become (e.g., change to) a new serving RAN as described herein and/or may not perform (e.g., skip) a N2 path switch. For example, if a new RAN determines not to become a new serving RAN for a WTRU as described herein, the new RAN may not initiate a N2 path switch. The new RAN may indicate this determination to a serving/anchor RAN of the WTRU (e.g., serving/anchor RAN that the WTRU was previously connected to). The new RAN may indicate to the WTRU that the new RAN is in a RRC_INACTIVE and/or RRC_IDLE state. For example, the new RAN may indicate to the WTRU that the new RAN is in RRC_INACTIVE and/or RRC_IDLE state after the new RAN has completed forwarding data (e.g., small data) through a NAS message(s) and/or the user plane. In examples, the indication to go back to an INACTIVE state and/or the forwarding of the NAS messages may be combined in a RRC message (e.g., a single RRC message). In examples, the indication to go back to an INACTIVE state and/or the forwarding of the NAS messages may not be combined in a RRC message (e.g., a single RRC message). The new RAN may indicate, e.g., via Xn signaling, to the serving RAN of the WTRU that the WTRU is now back in a RRC_INACTIVE and/or RRC_IDLE state. The new RAN may indicate to the serving RAN of the WTRU that the serving RAN associated with the WTRU has not been changed.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
receive a first message from a first node, wherein the first message indicates an identification (ID) for a protocol data unit (PDU) session, wherein the first node is associated with a first radio access network (RAN);
transmit a second message to a second node wherein the second message indicates an amount of data to be transmitted and indicates the ID for the PDU session, wherein the second node is associated with a second RAN;
receive a third message from the second node, wherein the third message indicates the ID for the PDU session and indicates that the PDU session has been resumed via the second node; and
transmit a fourth message-to the second node, wherein the fourth message indicates the ID for the PDU session and comprises data associated with the amount of data indicated to be transmitted.

2. The WTRU of claim 1, wherein the second message comprises a connection resume message indicating to resume a radio resource control (RRC) connection via the second node, and wherein the WTRU has been moved from the first node to the second node.

3. The WTRU of claim 1, wherein
the second message further comprises a transition indication indicating that the WTRU is transitioning to an inactive state or an idle state after transmitting the data to the second node.

4. The WTRU of claim 1, wherein the third message comprises a connection resume message indicating that the WTRU is RRC connected, and wherein the connection resume message indicates that the second node has established a forwarding connection between the second node and the first node for the second node to forward the data to the first node.

5. The WTRU of claim 1, wherein the processor is configured to:
   transmit the data via at least one of a non-access stratum (NAS) message or a user plane (UP) associated with the second node.

6. The WTRU of claim 1, wherein the processor is configured to:
   receive a fifth message from the second node after transmitting the data to the second node, wherein the fifth message comprises an RRC inactive message, and wherein the fifth message further indicates that the first node is to remain as a serving node for the WTRU.

7. A method for a wireless transmit/receive unit (WTRU) comprising:
   receiving a first message from a first node, wherein the first message indicates an identification (ID) for a protocol data unit (PDU) session, wherein the first node is associated with a first radio access network (RAN)
   transmitting a second message to a second node, wherein the second message indicates an amount of data to be transmitted and indicates the ID for the PDU session, wherein the second node is associated with a second RAN;
   receiving a third message from the second node, wherein the third message indicates the ID for the PDU session and indicates that the PDU session has been resumed via the second node; and
   transmitting a fourth message to the second node, wherein the fourth message indicates the ID for the PDU session and comprises data associated with the amount of data indicated to be transmitted.

8. The method of claim 7, wherein the second message comprises a connection resume message indicating a resume connection indication to resume a radio resource control (RRC) connection via the second node, and wherein the WTRU has been moved from the first node to the second node.

9. The method of claim 7, wherein
   the second message further comprises a transition indication indicating that the WTRU is transitioning to an inactive state or an idle state after transmitting the data to the second node.

10. The method of claim 7, wherein the third message comprises a connection resume message, and the connection resume message indicates that the WTRU is RRC connected, and wherein the second node establishes a forwarding connection between the second node and the first node for the second node to forward the data to the first node; and
    wherein the method comprises:
    transmitting the data via at least one of a non-access stratum (NAS) message or a user plane (UP) associated with the second node.

11. A wireless transmit/receive unit (WTRU) comprising:
    a processor configured to:
    receive a first message from a network node, wherein the first message indicates an identification (ID) for a protocol data unit (PDU) session, wherein the network node is associated with a radio access network (RAN)
    send a deactivation indication to the network node, wherein the deactivation indication indicates to deactivate a user plane (UP) connection associated with the ID for the PDU session;
    receive an indication from the network node, wherein the indication indicates to maintain a PDU session context associated with the ID for the PDU session; and
    transmit data via a control plane (CP) using the maintained PDU session context.

12. The WTRU of claim 11, wherein to send the deactivation indication, the processor is configured to:
    determine to send the deactivation indication to deactivate the UP connection based on an amount of data expected to be transmitted, wherein on a condition that the amount of data expected to be transmitted is small, deactivate the UP connection and transmit the data via the CP using the maintained PDU session context, and on a condition that the amount of data expected to be transmitted is large, maintain the UP connection and transmit the data using the ID for the PDU session.

13. The WTRU of claim 11, wherein the data transmitted via the CP is smaller than data to be transmitted via the UP connection, and wherein the deactivation indication further indicates to switch from the UP connection to a CP connection.

14. The WTRU of claim 11, wherein the deactivation indication comprises at least one of a deactivation message, a non-access stratum (NAS) message, a UP deactivation request, a PDU session ID, or a CP optimization indication.

15. The WTRU of claim 11, wherein to maintain the PDU session context, the processor is configured to maintain a network layer address associated with the PDU session.

16. The WTRU of claim 11, wherein the processor is configured to transmit the data via the CP using the same ID for the PDU session as the one used prior to deactivating the UP connection.

17. A first network node comprising:
    a processor configured to:
    receive a first message from a wireless transmit/receive unit (WTRU), wherein the first message indicates an amount of data expected to be transmitted and the first message indicates an identification (ID) for a protocol data unit (PDU) session;
    determine that the ID for the PDU session is associated with a second network node, wherein the second network node is associated with a radio access network (RAN);
    based on the determination that the ID for the PDU session is associated with the second network node, send a second message to the WTRU, wherein the second message indicates that the ID for the PDU session has been resumed via the first network node;
    receive data from the WTRU via the first network node; and
    forward the data to the second network node via the first network node.

18. The first network node of claim 17, wherein the processor is configured to:
    determine that the ID for the PDU session associated with the second network node is associated with an anchor RAN, and wherein the first network node is different than the second network node.

19. The first network node of claim 17, wherein the second message comprises a connection resume message indicating that the WTRU is RRC connected, and wherein the processor is configured to:
    establish a forwarding connection with the second network node to forward the data.

* * * * *